United States Patent
Hou et al.

(10) Patent No.: US 12,206,593 B2
(45) Date of Patent: Jan. 21, 2025

(54) PACKET FLOW OUT-OF-ORDER DETECTION METHOD, PACKET PROCESSING METHOD, AND APPARATUS

(71) Applicant: HUAWEI TECHNOLOGIES CO., LTD., Guangdong (CN)

(72) Inventors: Jie Hou, Beijing (CN); Chenxin Feng, Beijing (CN); Guang Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 340 days.

(21) Appl. No.: 17/695,169

(22) Filed: Mar. 15, 2022

(65) Prior Publication Data

US 2022/0217092 A1    Jul. 7, 2022

Related U.S. Application Data

(63) Continuation of application No. PCT/CN2020/112374, filed on Aug. 31, 2020.

(30) Foreign Application Priority Data

Sep. 16, 2019 (CN) .......................... 201910872268.7
Sep. 30, 2019 (CN) .......................... 201910944452.8

(51) Int. Cl.
*H04L 47/34* (2022.01)
*H04L 47/2483* (2022.01)

(52) U.S. Cl.
CPC .......... *H04L 47/34* (2013.01); *H04L 47/2483* (2013.01)

(58) Field of Classification Search
None
See application file for complete search history.

(56) References Cited

U.S. PATENT DOCUMENTS

| 2015/0124611 A1 | 5/2015 | Attar et al. |
| 2015/0127797 A1 | 5/2015 | Attar et al. |

(Continued)

FOREIGN PATENT DOCUMENTS

| CN | 1859286 A | 11/2006 |
| CN | 101841545 A | 9/2010 |

(Continued)

OTHER PUBLICATIONS

Erico Vanini, Rong Pan, Mohammad Alizadeh, Ciscosystems Parvin Taheri, Tom Edsall, MassachusettsInstitute of Technology: "Let it Flow: Resilient Asymmetric LoadBalancing with Flowlet Switching", Mar. 27, 2017 (Mar. 27, 2017), pp. 414-427, XP061 025198.

*Primary Examiner* — Diane L Lo
(74) *Attorney, Agent, or Firm* — WOMBLE BOND DICKINSON (US) LLP

(57) ABSTRACT

This application describes a packet flow out-of-order detection method. After receiving a first packet from a second node, a first node parses the first packet to obtain a flow segment sequence number of the first packet. After receiving the first packet, the first node continues to receive a second packet from the second node, and parses the second packet to obtain a flow segment sequence number of the second packet. The first packet and the second packet belong to a same packet flow. In view of this, the first node may compare the flow segment sequence number of the first packet with the flow segment sequence number of the second packet, to determine whether the packet flow is out of order.

19 Claims, 4 Drawing Sheets

(56) References Cited

U.S. PATENT DOCUMENTS

2017/0171156 A1     6/2017  Schultz et al.
2018/0176816 A1*    6/2018  Meylan ............... H04L 47/2433
2018/0191835 A1*    7/2018  Saldanha ............. H04L 67/142
2018/0351861 A1*    12/2018 Vasudevan ............ H04L 45/38

FOREIGN PATENT DOCUMENTS

| CN | 102868636 A  | 1/2013  |
|----|--------------|---------|
| CN | 104168212 A  | 11/2014 |
| CN | 105407096 A  | 3/2016  |
| CN | 105591974 A  | 5/2016  |
| CN | 107454276 A  | 12/2017 |
| CN | 108243211 A  | 7/2018  |
| CN | 108370377 A  | 8/2018  |
| CN | 110505092 A  | 11/2019 |
| CN | 110943933 A  | 3/2020  |
| WO | 2013067377 A2 | 5/2013 |

* cited by examiner

PACKET FLOW OUT-OF-ORDER DETECTION METHOD, PACKET PROCESSING METHOD, AND APPARATUS

CROSS-REFERENCE TO RELATED APPLICATIONS

This application is a continuation of International Application PCT/CN2020/112374, filed on Aug. 31, 2020, which claims priority to Chinese Patent Application No. 201910944452.8, filed on Sep. 30, 2019 and Chinese Patent Application No. 201910872268.7, filed on Sep. 16, 2019. All of the aforementioned patent applications are hereby incorporated by reference in their entireties.

TECHNICAL FIELD

This application relates to the communication field, and in particular, to a packet flow out-of-order detection method, a packet processing method, and an apparatus.

BACKGROUND

In a transmission process, a packet may carry information related to packet transmission, and the information may be a 2-tuple, a 5-tuple, or a 7-tuple. The 2-tuple includes a source internet protocol (IP) address and a destination IP address. The 5-tuple includes a source IP address, a source port, a destination IP address, a destination port, and a transport layer protocol number. The 7-tuple includes a source media access control (MAC) address, a destination MAC address, a source IP address, a destination IP address, a protocol number, a source port, and a destination port.

If the information carried in a plurality of packets consecutively transmitted between two nodes are all the same, the consecutive packets may also be referred to as a packet flow. A packet sending node may divide one packet flow into a plurality of flow segments based on time at which the packet sending node obtains a packet. One flow segment includes a plurality of packets. A time interval between any two consecutive packets in a same flow segment is less than a preset time interval, and a time interval between two adjacent packets in two adjacent flow segments is greater than or equal to the foregoing preset time interval.

To improve packet transmission efficiency, the flow segments may be transmitted in a load balancing manner. However, when the flow segments are transmitted in the load balancing manner, the packet flow may be out of order. That the packet flow is out of order means that a sequence in which a receiving node receives packets is inconsistent with a sequence in which a sending node sends the packets. If the packet flow is out of order, subsequent further processing on the packets may be affected. In other words, it is particularly important to determine whether the packet flow is out of order. Therefore, a solution is urgently needed to determine whether the packet flow is out of order.

SUMMARY

According to a first aspect, an embodiment of this application provides a packet flow out-of-order detection method, where packets sent by a second node to a first node carry sequence numbers of flow segments to which the packets belong. Specifically, the second node may add, based on a sequence of sending the packets to the first node, corresponding flow segment sequence numbers to the packets sent to the first node. After receiving the packets from the second node, the first node may determine, with reference to the flow segment sequence numbers carried in the packets, whether the packets are out of order. Specifically, after receiving a first packet from the second node, the first node parses the first packet to obtain a flow segment sequence number of the first packet. Each flow segment sequence number corresponds to one flow segment, each flow segment includes a plurality of packets, and the plurality of packets have a same flow segment sequence number. After receiving the first packet, the first node continues to receive a second packet from the second node, and parses the second packet to obtain a flow segment sequence number of the second packet. The first packet and the second packet mentioned herein belong to a same packet flow. It may be understood that, because the flow segment sequence number of the first packet and the flow segment sequence number of the second packet are added by the second node based on the sequence of sending the packets to the first node, the flow segment sequence number of the first packet and the flow segment sequence number of the second packet may reflect a sequence of sending the first packet and the second packet by the second node. In view of this, after obtaining the flow segment sequence number of the first packet and the flow segment sequence number of the second packet, the first node may compare the flow segment sequence numbers to obtain a first comparison result, and determine, based on the first comparison result, whether the packet flow is out of order. It can be learned that, by using this solution, whether a packet flow is out of order when the packet flow is forwarded as flow segments may be determined.

In a possible embodiment, the flow segment sequence number of the first packet and the flow segment sequence number of the second packet may be added by the second node based on the sequence of sending the packets to the first node. Specifically, when the second node adds the corresponding flow segment sequence numbers to the packets, the flow segment sequence numbers may be added in ascending manner or descending manner. Adding the flow segment sequence numbers in ascending manner means that a flow segment sequence number corresponding to a flow segment that is sent first is less than a flow segment sequence number corresponding to a flow segment that is sent later. Adding the flow segment sequence numbers in descending manner means that a flow segment sequence number corresponding to a flow segment that is sent first is greater than a flow segment sequence number corresponding to a flow segment that is sent later. When the second node adds the corresponding flow segment sequence numbers to the packets in ascending manner, in an implementation of this embodiment of this application, that the first node determines, based on the first comparison result, whether the packet flow is out of order may be specifically implemented as follows: For example, when the flow segment sequence number of the second packet is less than the flow segment sequence number of the first packet, the first node determines that the packet flow is out of order. This is because when the flow segment sequence number of the second packet is less than the flow segment sequence number of the first packet, it indicates that a sequence in which the first node receives the first packet and the second packet is inconsistent with the sequence in which the second node sends the first packet and the second packet. When the second node adds the corresponding flow segment sequence numbers to the packets in descending manner, that the first node determines, based on the first comparison result, whether the packet flow is out of order may be specifically implemented as follows: For example, when the flow segment sequence number of the second packet is greater than the flow segment sequence number of the first packet, the first node determines that the packet flow is out of order. This is because when the flow segment sequence number of the second packet is greater than the flow segment sequence number of the first packet, it indicates that a sequence in which the first node receives the first packet and the second packet is inconsistent with the sequence in which the second node sends the first packet and the second packet.

In a possible embodiment, the second packet may further carry a first identifier, and a value of the first identifier is used to indicate whether the second packet belongs to the $1^{st}$ flow segment of a subflow of the packet flow. The subflow mentioned herein may be considered as a subset of a flow. When obtaining the $1^{st}$ packet of the subflow, the second node may generate a corresponding flow segment forwarding entry for the packet. Correspondingly, the first node may determine, with reference to the first comparison result and the first identifier, whether the packet flow is out of order.

In a possible embodiment, when the second packet carries the first identifier, if the second node adds the corresponding flow segment sequence numbers to the packets in ascending manner, that the first node determines, with reference to the first comparison result and the first identifier, whether the packet flow is out of order may be specifically as follows: When the flow segment sequence number of the second packet is less than the flow segment sequence number of the first packet, and the value of the first identifier indicates that the second packet does not belong to the $1^{st}$ flow segment of the subflow of the packet flow, the first node determines that the packet flow is out of order. Correspondingly, if the second node adds the corresponding flow segment sequence numbers to the packets in descending manner, that the first node determines, with reference to the first comparison result and the first identifier, whether the packet flow is out of order may be specifically as follows: When the flow segment sequence number of the second packet is greater than the flow segment sequence number of the first packet, and the value of the first identifier indicates that the second packet does not belong to the $1^{st}$ flow segment of the subflow of the packet flow, the first node determines that the packet flow is out of order.

In a possible embodiment, when flow segments are transmitted in a load balancing manner, an effect of the load balancing may need to be evaluated, or a transmission manner of the packet flow may be further adjusted based on a current effect of the load balancing. A quantity of times that the packet flow is out of order may be used as an indicator for evaluating the effect of the load balancing. In view of this, in an implementation of this embodiment of this application, the first node may further count the quantity of times that the packet flow is out of order, and send the quantity of times that the packet flow is out of order to the second node or a controller, so that the second node or the controller evaluates the effect of the load balancing based on the quantity of times that the packet flow is out of order.

In a possible embodiment, efficiency of generating flow segments by the second node also affects an effect of load balancing to some extent. The efficiency of generating the flow segments refers to efficiency of obtaining the flow segments by dividing the packet flow by the second node. Usually, higher efficiency of generating the flow segments by the second node indicates a better corresponding effect of load balancing, and lower efficiency of generating the flow segments by the second node indicates a worse corresponding effect of load balancing. In view of this, in this embodiment of this application, the first node may further count a quantity of flow segments of the packet flow that are received within unit time, and send the counted quantity of flow segments of the packet flow to the second node or the controller, so that the second node or the controller determines, based on the quantity of flow segments, efficiency of generating flow segments by the second node or the controller.

In a possible embodiment, when the second node obtains the flow segments through division, there is an important indicator, namely, a time interval between adjacent packets. For ease of description, the time interval is referred to as a time interval of flow segments. It may be understood that, a larger time interval of the flow segments indicates a larger time interval between the last packet of a previous flow segment and the $1^{st}$ packet of a subsequent flow segment, and indicates a lower probability of out-of-order packets when the flow segments are transmitted in a load balancing manner. In view of this, the first node may not only count the quantity of times that the packet flow is out of order, but may also adjust the time interval of the flow segments with reference to the quantity of times that the packet flow is out of order, and further send the adjusted time interval of the flow segments to the second node, so that the second node divides the packet flow into the flow segments based on the adjusted time interval of the flow segments. For ease of description, the "adjusted time interval of the flow segments" is referred to as a "target time interval of the flow segments". That is, the first node may further calculate the target time interval of the flow segments based on the quantity of times that the packet flow is out of order, and send the target time interval to the second node, so that the second node divides the packet flow into a plurality of flow segments based on the target time interval.

In a possible embodiment, it is considered that an out-of-order rate of a packet flow is an important indicator for measuring an effect of load balancing, and the out-of-order rate of the packet flow is also related to a preset time interval. Therefore, the first node may further count a quantity of times that the packet flow is not out of order, then calculate the out-of-order rate of the packet flow based on the quantity of times that the packet flow is out of order and the quantity of times that the packet flow is not out of order, and adjust the preset time interval based on the out-of-order rate, to obtain the target time interval. Specifically, the first node may compare the calculated out-of-order rate with a preset out-of-order rate to obtain a second comparison result, and then calculate the target time interval of the flow segments of the packet flow based on the second comparison result and the preset time interval.

In a possible embodiment, a higher quantity of the flow segments received by the first node within unit time indicates a smaller preset time interval used by the second node to divide the packet flow into the plurality of flow segments, and also indicates a relatively high probability that the packet flow is out of order; and vice versa. Therefore, when the quantity of times that packet flow is out of order is relatively high, and the quantity of the flow segments received by the first node within unit time is also relatively high, a time interval between the flow segments may be reduced; and vice versa. Specifically, the first node may count the quantity of the flow segments of the packet flow that are received in the unit time, then compare a preset quantity with the counted quantity of the flow segments of the packet flow, to obtain a third comparison result, and calculate the target time interval with reference to the quantity of times that the packet flow is out of order and the third comparison result.

According to a second aspect, an embodiment of this application provides a packet processing method. A second node may add, based on a sequence of sending packets to a first node, corresponding flow segment sequence numbers to the packets sent to the first node. Usually, a sequence in which the second node obtains the packets is consistent with the sequence in which the second node sends the packets to the first node. Therefore, the second node may add the corresponding flow segment sequence numbers to the packets in the sequence in which the second node obtains the packets. Specifically, the second node obtains a first packet, where the first packet carries a flow segment sequence number of the first packet. The first packet carries the flow segment sequence number of the first packet, and the flow segment sequence number of the first packet is used to indicate a sequence number of a flow segment to which the first packet belongs. The second node may generate the flow segment sequence number of the first packet according to a specific rule. After obtaining the first packet, the second node may send the first packet to the first node. Then, the second node continues to obtain a second packet, where the second packet carries a flow segment sequence number of the second packet, and the flow segment sequence number of the second packet is used to indicate a sequence number of a flow segment to which the second packet belongs. In this embodiment of this application, when the second packet and the first packet belong to a same packet flow, the flow segment sequence number of the second packet is determined based on a time interval between the second packet and the first packet. After obtaining the second packet, the second node may send the second packet to the first node. After receiving the first packet and the second packet, the first node may determine, based on the flow segment sequence number of the first packet and the flow segment sequence number of the second packet, whether the packet flow is out of order.

In a possible embodiment, the flow segment sequence number of the first packet is used to indicate the sequence number of the flow segment to which the first packet belongs. The flow segment sequence number of the second packet is used to indicate the sequence number of the flow segment to which the second packet belongs. If the first packet and the second packet belong to a same flow segment, the flow segment sequence number of the first packet is equal to the flow segment sequence number of the second packet. In other words, when the second node determines the flow segment sequence number of the second packet based on the time interval between the second packet and the first packet, if the second node determines that the time interval between the second packet and the first packet is less than or equal to a first preset time interval, the second node determines the flow segment sequence number of the first packet as the flow segment sequence number of the second packet. That the time interval between the second packet and the first packet is less than or equal to a first preset time interval indicates that the first packet and the second packet belong to the same flow segment. The first preset time interval is not specifically limited in this embodiment of this application, and the first preset time interval may be determined based on an actual situation.

In a possible embodiment, if the time interval between the second packet and the first packet is greater than the first preset time interval, it indicates that the first packet and the second packet belong to different flow segments. In this case, whether the first packet and the second packet belong to a same subflow needs to be further considered. If the second packet and the first packet belong to the same subflow of the packet flow, in other words, the time interval between the second packet and the first packet is less than or equal to a second preset time interval, the flow segment sequence number of the second packet may be determined based on the flow segment sequence number of the first packet. Specifically, the second node may determine the flow segment sequence number of the second packet based on the flow segment sequence number of the first packet. Specifically, the second node may determine, based on the flow segment sequence number of the first packet, a value that is not equal to the flow segment sequence number of the first packet, and use the value as the flow segment sequence number of the second packet. For example, the second node may determine the flow segment sequence number of the second packet based on the flow segment sequence number of the first packet in ascending manner of flow segment sequence numbers. For another example, the second node may determine the flow segment sequence number of the second packet based on the flow segment sequence number of the first packet in descending manner of flow segment sequence numbers.

In a possible embodiment, if the first packet and the second packet belong to the same subflow, the second node may further include a first identifier in the second packet, where a value of the first identifier is used to indicate that the second packet and an adjacent previous packet, namely, the first packet, belong to the same subflow but different flow segments. The first identifier mentioned herein may alternatively be carried in a flow segment forwarding entry corresponding to the second packet. In other words, the second packet may further carry the first identifier used to indicate that the second packet and the adjacent previous packet belong to the same subflow but different flow segments.

In a possible embodiment, if the second packet and the first packet belong to different subflows of the packet flow, in other words, the time interval between the second packet and the first packet is greater than the second preset time interval, because the flow segment sequence number of the first packet has been deleted, the second node cannot obtain the flow segment sequence number corresponding to the first node. In this case, in this embodiment of this application, the flow segment sequence number of the second packet may be determined according to a preset rule. In other words, the second node may determine the flow segment sequence number of the second packet according to the preset rule. The preset rule is not specifically limited in this embodiment of this application, and the preset rule may be determined based on an actual situation. For example, a sequence number may be randomly generated as the flow segment sequence number corresponding to the second packet. For another example, an initial sequence number may be determined as the flow segment sequence number corresponding to the second packet. It may be understood that, in this case, because a value relationship between the flow segment sequence number of the second packet and the flow segment sequence number of the first packet is irregular, the first node may not determine, based only on the flow segment sequence number of the first packet and the flow segment sequence number of the second packet, whether the packet flow is out of order. To enable the first node to accurately determine whether the packet flow is out of order, in an implementation of this embodiment of this application, the second packet may further carry a second identifier, and a value of the second identifier is used to indicate that the second packet belongs to the $1^{st}$ flow segment of a subflow of the packet flow, so that the first node determines, with reference to the second identifier, the flow segment sequence number of the second packet, and the flow segment sequence number of the first packet, whether the packet flow is out of order.

In a possible embodiment, in actual application, the $1^{st}$ flow segment of the subflow may include a plurality of packets. In this case, in this embodiment of this application, if the second node determines that the second packet belongs to the $1^{st}$ flow segment of the subflow of the packet flow, for another obtained packet, for example, a third packet, corresponding to a time interval that is between the another packet and the second packet and that is less than the first preset time interval, the third packet carries a flow segment sequence number of the third packet and a third identifier, where the flow segment sequence number of the third packet is equal to the flow segment sequence number of the second packet, and a value of the third identifier indicates that the third packet belongs to the $1^{st}$ flow segment of the subflow of the packet flow.

In a possible embodiment, the flow segments are obtained by the second node through division, and a flow segment division manner affects an effect of transmitting the flow segments in a load balancing manner. Therefore, in this embodiment of this application, the second node may further adjust the flow segment division manner. Specifically, the second node may obtain the target time interval of the flow segments of the packet flow, and divide the packet flow into the plurality of flow segments based on the target time interval of the flow segments of the packet flow. A specific implementation in which the second node obtains the target time interval is not specifically limited in this embodiment of this application. In an example, the second node may obtain the target time interval from the first node. In still another example, the second node may obtain the target time interval through calculation. In still another example, a controller may obtain the target time interval through calculation. Correspondingly, the second node may obtain the target time interval from the controller.

In a possible embodiment, a specific implementation in which the second node obtains the target time interval through calculation is as follows: For example, the second node may receive, from the first node, a quantity of times that packet flow is out of order, and then calculates the target time interval of the flow segments of the packet flow based on the quantity of times that packet flow is out of order.

In a possible embodiment, a specific implementation in which the second node obtains the target time interval through calculation is as follows: For example, the second node may further receive, from the first node, a quantity of times that the packet flow is not out of order, and calculate an out-of-order rate of the packet flow based on the quantity of times that the packet flow is out of order and the quantity of times that the packet flow is not out of order. Then, the second node compares the out-of-order rate of the packet flow with a preset out-of-order rate, to obtain a first comparison result. Finally, the second node calculates the target time interval of the flow segments of the packet flow based on a first comparison result and the first preset time interval. The first preset time interval mentioned herein refers to a sending time interval between adjacent packets that corresponds to flow segments currently generated by the second node.

In a possible embodiment, a specific implementation in which the second node obtains the target time interval through calculation is as follows: For example, after the second node obtains a quantity of flow segments of the packet flow that are received from the first node within unit time, the second node compares the quantity of flow segments of the packet flow with a preset quantity, to obtain a second comparison result. The second node then calculates the target time interval of the flow segments of the packet flow based on the quantity of times that the packet flow is out of order and the second comparison result.

According to a third aspect, an embodiment of this application provides a packet processing method. Specifically, a controller may receive, from a first node, a quantity of times that a packet flow is out of order, and then the controller calculates a target time interval of flow segments of the packet flow based on the quantity of times that the packet flow is out of order. After obtaining the target time interval through calculation, the controller may send the target time interval obtained through calculation to a second node, so that the second node divides the packet flow into a plurality of flow segments based on the target time interval.

In a possible embodiment, a specific implementation in which the controller obtains the target time interval through calculation is as follows: For example, the controller may further receive, from the first node, a quantity of times that the packet flow is not out of order, and calculate an out-of-order rate of the packet flow based on the quantity of times that the packet flow is out of order and the quantity of times that the packet flow is not out of order. Then, the controller compares the out-of-order rate of the packet flow with a preset out-of-order rate, to obtain a first comparison result. Finally, the controller calculates the target time interval of the flow segments of the packet flow based on a second comparison result and a first preset time interval. The first preset time interval mentioned herein refers to a sending time interval between adjacent packets that corresponds to flow segments currently generated by the controller.

In a possible embodiment, a specific implementation in which the controller obtains the target time interval through calculation is as follows: For example, after the controller obtains a quantity of flow segments of the packet flow that are received from the first node within unit time, the controller compares the quantity of flow segments of the packet flow with a preset quantity, to obtain a second comparison result. The controller then calculates the target time interval of the flow segments of the packet flow based on the quantity of times that the packet flow is out of order and the second comparison result.

According to a fourth aspect, an embodiment of this application provides a packet flow out-of-order detection apparatus, where the apparatus includes: a first receiving unit, configured to receive a first packet from a second node, where the first packet includes a flow segment sequence number of the first packet; a second receiving unit, configured to: after receiving the first packet, receive a second packet from the second node, where the second packet includes a flow segment sequence number of the second packet, and the first packet and the second packet belong to a same packet flow; a comparison unit, configured to compare the flow segment sequence number of the first packet with the flow segment sequence number of the second packet, to obtain a first comparison result; and an out-of-order determining unit, configured to determine, based on the first comparison result, whether the packet flow is out of order.

In a possible embodiment, the out-of-order determining unit is specifically configured to: when the flow segment sequence number of the second packet is less than the flow segment sequence number of the first packet, determine that the packet flow is out of order.

In a possible embodiment, the second packet further includes a first identifier, and a value of the first identifier indicates whether the second packet belongs to the $1^{st}$ flow segment of a subflow of the packet flow; and the out-of-order determining unit is specifically configured to determine, based on the first comparison result and the value of the first identifier, whether the packet flow is out of order.

In a possible embodiment, the out-of-order determining unit is specifically configured to: when the flow segment sequence number of the second packet is less than the flow segment sequence number of the first packet, and the value of the first identifier indicates that the second packet does not belong to the $1^{st}$ flow segment of the subflow of the packet flow, determine that the packet flow is out of order.

In a possible embodiment, the apparatus further includes: a first counting unit, configured to count a quantity of times that the packet flow is out of order; and a first sending unit, configured to send the quantity of times that the packet flow is out of order to the second node or a controller.

In a possible embodiment, the apparatus further includes: a second counting unit, configured to count a quantity of flow segments of the packet flow that are received within unit time; and a second sending unit, configured to send the quantity of flow segments of the packet flow to the second node or the controller.

In a possible embodiment, the apparatus further includes: a third counting unit, configured to count a quantity of times that the packet flow is out of order; a first calculation unit, configured to calculate a target time interval of flow segments of the packet flow based on the quantity of times that the packet flow is out of order; and a third sending unit, configured to send the target time interval to the second node.

In a possible embodiment, the first calculation unit is specifically configured to: count a quantity of times that the packet flow is not out of order; obtain a preset time interval of the flow segments into which the second node divides the packet flow; calculate an out-of-order rate of the packet flow based on the quantity of times that the packet flow is out of order and the quantity of times that the packet flow is not out of order; compare the out-of-order rate of the packet flow with a preset out-of-order rate to obtain a second comparison result; and calculate the target time interval of the flow segments of the packet flow based on the second comparison result and the preset time interval.

In a possible embodiment, the first calculation unit is specifically configured to: count a quantity of flow segments of the packet flow that are received within unit time; compare the quantity of flow segments of the packet flow with a preset quantity, to obtain a third comparison result; and calculate a target time interval of the flow segments of the packet flow based on the quantity of times that the packet flow is out of order and the third comparison result.

According to a fifth aspect, an embodiment of this application provides a packet processing apparatus, where the apparatus includes: a first obtaining unit, configured to obtain a first packet, where the first packet carries a flow segment sequence number of the first packet, and the flow segment sequence number of the first packet indicates a sequence number of a flow segment to which the first packet belongs; a first sending unit, configured to send the first packet to a first node; a second obtaining unit, configured to obtain a second packet after obtaining the first packet, where the second packet carries a flow segment sequence number of the second packet, and the flow segment sequence number of the second packet indicates a sequence number of a flow segment to which the second packet belongs; and when the second packet and the first packet belong to a same packet flow, the flow segment sequence number of the second packet is determined based on a time interval between the second packet and the first packet; and a second sending unit, configured to send the second packet to the first node.

In a possible embodiment, when the time interval between the second packet and the first packet is less than or equal to a first preset time interval, the flow segment sequence number of the second packet is the flow segment sequence number of the first packet.

In a possible embodiment, when the time interval between the second packet and the first packet is greater than a first preset time interval and less than a second preset time interval, the flow segment sequence number of the second packet is determined based on the flow segment sequence number of the second packet, and the flow segment sequence number of the second packet is not equal to the flow segment sequence number of the first packet.

In a possible embodiment, the second packet further carries a first identifier, and a value of the first identifier is used to indicate that the second packet and an adjacent previous packet belong to a same subflow but different flow segments.

In a possible embodiment, when the time interval between the second packet and the first packet is greater than or equal to a second preset time interval, the flow segment sequence number of the second packet is determined according to a preset rule; and the second packet further carries a second identifier, and a value of the second identifier is used to indicate that the second packet is a packet of the $1^{st}$ flow segment of a subflow of the packet flow.

In a possible embodiment, the apparatus further includes: a third obtaining unit, configured to obtain a third packet after obtaining the second packet, where the third packet and the second packet belong to a same packet flow, and the third packet carries a flow segment sequence number of the third packet and a third identifier; and when the time interval between the third packet and the second packet that are obtained by a second node is less than or equal to a first preset time interval, the flow segment sequence number of the third packet is the same as the flow segment sequence number of the second packet, a value of the third identifier indicates that the third packet is a packet of the $1^{st}$ flow segment of the subflow of the packet flow, and the first preset time interval is less than the second preset time interval; and a third sending unit, configured to send the third packet to the first node.

In a possible embodiment, the apparatus further includes: a fourth obtaining unit, configured to obtain a target time interval of flow segments of the packet flow; and a flow segment division unit, configured to divide the packet flow into a plurality of flow segments based on the target time interval of the flow segments of the packet flow.

In a possible embodiment, the fourth obtaining unit is specifically configured to: receive, from the first node, a quantity of times that the packet flow is out of order; and calculate the target time interval of the flow segments of the packet flow based on the quantity of times that the packet flow is out of order.

In a possible embodiment, the calculating the target time interval of the flow segments of the packet flow based on the quantity of times that the packet flow is out of order includes: receiving, from the first node, a quantity of times that the packet flow is not out of order; calculating an out-of-order rate of the packet flow based on the quantity of times that the packet flow is out of order and the quantity of times that the packet flow is not out of order; comparing the out-of-order rate of the packet flow with a preset out-of-order rate, to obtain a first comparison result; and calculating the target time interval of the flow segments of the packet flow based on the first comparison result and the first preset time interval.

In a possible embodiment, the calculating the target time interval of the flow segments of the packet flow based on the quantity of times that the packet flow is out of order includes: obtaining, from the first node, a quantity of flow segments of the packet flow that are received within unit time; comparing the quantity of flow segments of the packet flow with a preset quantity, to obtain a second comparison result; and calculating the target time interval of the flow segments of the packet flow based on the quantity of times that the packet flow is out of order and the second comparison result.

According to a sixth aspect, an embodiment of this application provides a packet processing apparatus, where the apparatus includes: an obtaining unit, configured to obtain a quantity of times that a packet flow received by a first node is out of order; a calculation unit, configured to calculate a target time interval of flow segments of the packet flow based on the quantity of times that the packet flow is out of order; and a sending unit, configured to send the target time interval to a second node, where the target time interval is used for dividing the packet flow into a plurality of flow segments.

In a possible embodiment, the calculation unit is specifically configured to: obtain a quantity of times that the packet flow received by the first node is not out of order; obtain a preset time interval of the flow segments into which the second node divides the packet flow; calculate an out-of-order rate of the packet flow based on the quantity of times that the packet flow is out of order and the quantity of times that the packet flow is not out of order; compare the out-of-order rate of the packet flow with a preset out-of-order rate, to obtain a first comparison result; and calculate the target time interval of the flow segments of the packet flow based on the first comparison result and the preset time interval.

In a possible embodiment, the calculation unit is specifically configured to: obtain a quantity of flow segments of the packet flow that are received by the first node within unit time; compare the quantity of flow segments of the packet flow with a preset quantity, to obtain a second comparison result; and calculate the target time interval of the flow segments of the packet flow based on the quantity of times that the packet flow is out of order and the second comparison result.

According to a seventh aspect, an embodiment of this application provides a packet flow out-of-order detection device. The device includes a processor and a memory. The memory is configured to store instructions. The processor is configured to execute the instructions in the memory, to perform the method according to any one of the first aspect and the possible embodiments and implementations.

According to an eighth aspect, an embodiment of this application provides a packet processing device. The device includes a processor and a memory. The memory is configured to store instructions. The processor is configured to execute the instructions in the memory, to perform the method according to any one of the second aspect.

According to a ninth aspect, an embodiment of this application provides a packet processing device. The device includes a processor and a memory. The memory is configured to store instructions. The processor is configured to execute the instructions in the memory, to perform the method according to any one of the third aspect and the possible embodiments and implementations.

According to a tenth aspect, an embodiment of this application provides a computer-readable storage medium, including instructions. When the instructions are run on a computer, the computer is enabled to perform the method according to any one of the first aspect, the method according to any one of the second aspect, or the method according to any one of the third aspect.

According to an eleventh aspect, an embodiment of this application provides a computer program product including instructions. When the instructions are run on a computer, the computer is enabled to perform the method according to any one of the first aspect, the method according to any one of the second aspect, or the method according to any one of the third aspect and the possible embodiments and implementations.

DESCRIPTION OF EMBODIMENTS

An embodiment of this application provides a packet flow out-of-order detection method, to determine whether a packet flow is out of order.

For ease of understanding, the following first describes an application scenario of embodiments of this application.

Figure 1:
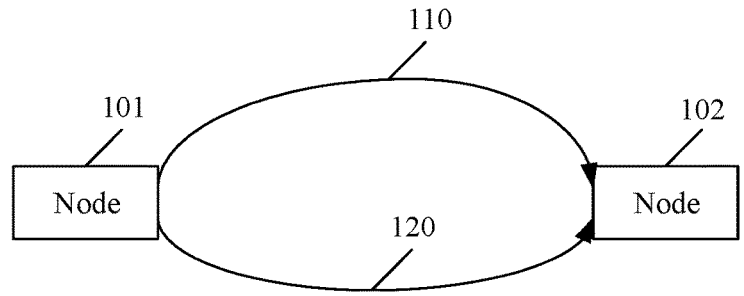
FIG. 1 is a schematic diagram of an example application scenario according to an embodiment of this application.

FIG. 1 is a schematic diagram of an example application scenario according to an embodiment of this application.

As shown in FIG. 1, there are two paths between a node 101 and a node 102: a path 110 and a path 120. To improve efficiency of sending a packet flow by the node 101 to the node 102, the node 101 may send flow segments to the node 102 by using the path 110 and the path 120. Different flow segments belonging to a same packet flow may be separately sent on the two paths. It may be understood that, if a previous packet sent by the node 101 to the node 102 has arrived at the node 102, the node 101 may select either of the path 110 and the path 120 to send a subsequent packet. This does not cause a problem that the packet flow is out of order. However, if the previous packet sent by the node 101 to the node 102 does not arrive at the node 102, and the node 101 continues to send the subsequent packet by using the path 110 and/or the path 120, there may be the problem that the packet flow is out of order. For example, an interval between a moment at which the node 101 sends a flow segment 1 by using the path 110 and a moment at which the node 101 sends a flow segment 2 to the node 102 by using the path 120 is 1 ms. A delay of the path 110 is 10 ms, and a delay of the path 120 is 8 ms. Consequently, one or more packets of the flow segment 2 arrive at the node 102 before one or more packets of the flow segment 1, and the packet flow is out of order.

It should be noted that the node 101 may be an ingress node for packet forwarding on a forwarding path, and the node 102 is an intermediate node or an egress node on the forwarding path.

It may be understood that if the packet flow is out of order, subsequent further processing on the packet flow may be affected. For example, the node 102 cannot correctly parse the packet flow. Therefore, it is particularly important to determine whether the packet flow is out of order.

In view of this, an embodiment of this application provides a packet flow out-of-order detection method. The following describes the packet flow out-of-order detection method provided in this embodiment of this application with reference to the accompanying drawings.

It should be noted that the node mentioned in this embodiment of this application may be a router or a switch.

Figure 2:
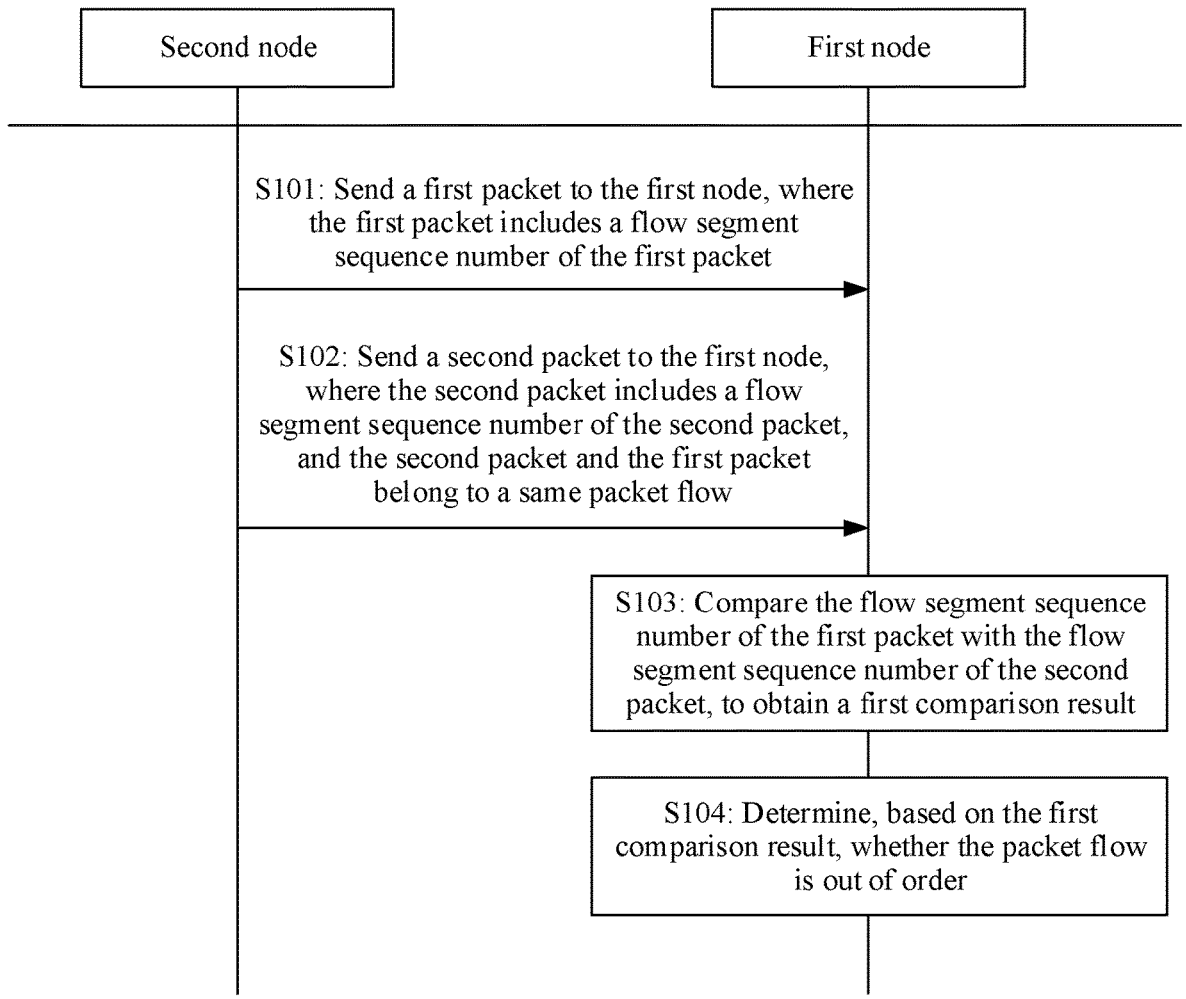
FIG. 2 is a signaling exchange diagram of a packet flow out-of-order detection method according to an embodiment of this application.

FIG. 2 is a signaling exchange diagram of a packet flow out-of-order detection method according to an embodiment of this application. The packet flow out-of-order detection method provided in this embodiment of this application may be implemented, for example, according to the following steps 101 to 104.

Step 101: A second node sends a first packet to a first node, where the first packet includes a flow segment sequence number of the first packet.

Step 102: The second node sends a second packet to the first node, where the second packet includes a flow segment sequence number of the second packet, and the second packet and the first packet belong to a same packet flow.

With respect to step 101 and step 102, it should be noted that the second node is a packet sending node, and the second node may be, for example, the node 101 shown in FIG. 1; the first node is a packet receiving node, and the first node may be, for example, the node 102 shown in FIG. 1. In this embodiment of this application, the second node may send packets to the first node by using one or more paths. When the second node sends the packets to the first node by using a plurality of paths, paths for sending the first packet and the second packet by the second node may be the same or different. This is not specifically limited in this embodiment of this application.

In this embodiment of this application, the first packet carries the flow segment sequence number of the first packet, and the second packet carries the flow segment sequence number of the second packet. The flow segment sequence number of the first packet is used to indicate a sequence number of a flow segment to which the first packet belongs, and the flow segment sequence number of the second packet is used to indicate a sequence number of a flow segment to which the second packet belongs. In this embodiment of this application, a plurality of packets belonging to a same flow segment correspond to a same flow segment sequence number, and packets belonging to different flow segments correspond to different flow segment sequence numbers. In other words, if the first packet and the second packet belong to a same flow segment, the flow segment sequence number of the first packet is equal to the flow segment sequence number of the second packet. If the first packet and the second packet belong to different flow segments, the flow segment sequence number of the first packet is different from the flow segment sequence number of the second packet.

It should be noted that in this embodiment of this application, the flow segment sequence number of the first packet is added to the first packet by the second node, and correspondingly, the flow segment sequence number of the second packet is added to the second packet by the second node. Specifically, the second node may add, based on a sequence of sending the packets to the first node, the corresponding flow segment sequence numbers to the first packet and the second packet. Usually, the sequence in which the second node sends the packets to the first node is consistent with a sequence in which the second node obtains the packets. In other words, the second node may add the corresponding flow segment sequence numbers to the first packet and the second packet based on the sequence in which the second node obtains the packets.

Figure 3:
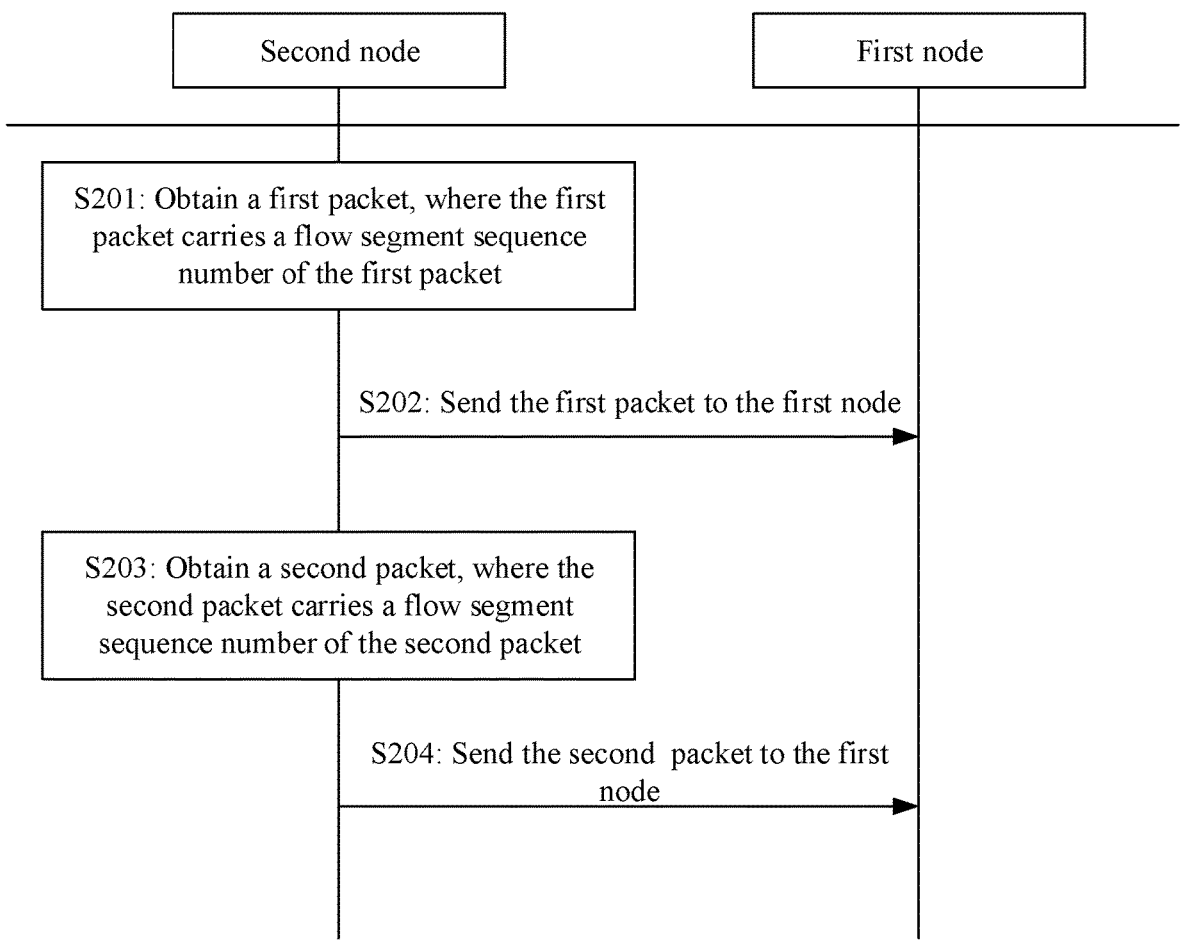
FIG. 3 is a signaling exchange diagram of a packet processing method according to an embodiment of this application.

For a specific implementation in which the second node adds corresponding flow segment sequence numbers to packets (for example, the packets include the first packet and the second packet) sent to the first node, refer to the following description part in FIG. 3. Details are not described herein again.

In this embodiment of this application, the flow segment sequence number of the first packet may be carried in, for example, a flow segment forwarding entry of the first packet. To be specific, a flow segment sequence number field is newly added to the flow segment forwarding entry of the first packet, and a value of the flow segment sequence number field is the flow segment sequence number of the first packet. Specifically, the flow segment forwarding entry corresponding to the first packet may be shown in the following Table 1.

TABLE 1

| Key | Path | FlowletSeq |
| --- | --- | --- |

"Key" is an index value of a flow segment forwarding entry, and a table lookup operation is performed by using information such as a 2-tuple, a 5-tuple, or a 7-tuple carried in the packet, or by using a hash value corresponding to information such as a 2-tuple, a 5-tuple, or a 7-tuple.

"Path" is a forwarding path of the first packet, and specific information depends on a forwarding plane protocol. For example, in a pure internet protocol version 4 (IPv4) scenario, "Path" represents an outbound interface of a packet. For another example, in a segment routing internet protocol version 6 (SRv6) scenario, "Path" corresponds to an SRv6 tunnel identifier.

"FlowletSeq" is a flow segment sequence number. For example, the flow segment sequence number may be represented by several bits, for example, may be represented by one byte, namely, eight bits.

It should be noted that Table 1 is merely shown for ease of understanding, and does not constitute a limitation on this embodiment of this application. In actual application, the flow segment forwarding entry corresponding to the first packet may further carry other information. The other information is not described herein one by one.

Correspondingly, the flow segment sequence number of the second packet may be carried, for example, in a flow segment forwarding entry of the second packet. For the flow segment forwarding entry of the second packet, refer to the description part of the flow segment forwarding entry of the first packet. Details are not described herein again.

Step 103: The first node compares the flow segment sequence number of the first packet with the flow segment sequence number of the second packet, to obtain a first comparison result.

Step 104: The first node determines, based on the first comparison result, whether the packet flow is out of order.

With respect to step 103 and step 104, it should be noted that after receiving the first packet and the second packet, the first node may separately parse the first packet and the second packet, to obtain the flow segment sequence number of the first packet and the flow segment sequence number of the second packet. As described above, because the flow segment sequence number of the first packet and the flow segment sequence number of the second packet are added by the second node in a sequence of sending the packets to the first node, the flow segment sequence number of the first packet and the flow segment sequence number of the second packet may represent whether the first packet and the second packet belong to the same flow segment, and may further represent the sequence in which the second node sends the first packet and the second packet. Therefore, the first node may compare the flow segment sequence number of the first packet with the flow segment sequence number of the second packet, and determine, based on the first comparison result obtained through the comparison, whether the packet flow is out of order.

As described above, the flow segment sequence number of the first packet and the flow segment sequence number of the second packet may be added by the second node in the sequence of sending the packets to the first node. Specifically, when the second node adds the corresponding flow segment sequence numbers to the packets, the flow segment sequence numbers may be added in ascending manner or descending manner. Adding the flow segment sequence numbers in ascending manner means that a flow segment sequence number corresponding to a flow segment that is sent first is less than a flow segment sequence number corresponding to a flow segment that is sent later. Adding the flow segment sequence numbers in descending manner means that a flow segment sequence number corresponding to a flow segment that is sent first is greater than a flow segment sequence number corresponding to a flow segment that is sent later.

It may be understood that, a case in which the packet flow is out of order usually occurs between different flow segments, and a plurality of packets in a same flow segment usually are not out of order. Therefore, when the second node adds the corresponding flow segment sequence numbers to the packets in ascending manner, in an implementation of this embodiment of this application, that the first node determines, based on the first comparison result, whether the packet flow is out of order may be specifically implemented as follows: For example, when the flow segment sequence number of the second packet is less than the flow segment sequence number of the first packet, the first node determines that the packet flow is out of order. This is because when the flow segment sequence number of the second packet is less than the flow segment sequence number of the first packet, it indicates that a sequence in which the first node receives the first packet and the second packet is inconsistent with the sequence in which the second node sends the first packet and the second packet. When the flow segment sequence number of the second packet is greater than or equal to the flow segment sequence number of the first packet, the first node determines that the packet flow is not out of order. This is because when the flow segment sequence number of the second packet is equal to the flow segment sequence number of the first packet, it indicates that the first packet and the second packet belong to the same flow segment; when the flow segment sequence number of the second packet is greater than the flow segment sequence number of the first packet, it indicates that a sequence in which the first node receives the first packet and the second packet is consistent with the sequence in which the second node sends the first packet and the second packet.

As described above, for example, the flow segment sequence number may be represented by several bits, and a maximum value that can be represented by the several bits is definite. When the flow segment sequence number reaches the maximum value that can be represented by the several bits, the flow segment sequence number may increase again from 0. For example, the flow segment sequence number is represented by three bits, and a maximum value that can be represented by the three bits is 7. After the flow segment sequence number reaches 7, the flow segment sequence number increases again from 0. It may be understood that, if the second node consecutively sends eight flow segments, flow segment sequence numbers corresponding to the eight flow segments in a flow segment sending sequence are 1-2-3-4-5-6-7-0. When the first node receives the $1^{st}$ second packet that corresponds to the flow segment sequence number 0, a flow segment sequence number that is of a first packet and that is carried in a previous received packet (for example, the last first packet that corresponds to the flow segment sequence number 7) is 7, and the flow segment sequence number that is of the second packet and that is carried in the second packet is 0. In this case, although the first node compares the flow segment sequence number 0 of the second packet with the flow segment sequence number 7 of the first packet, a comparison result obtained by the first node is still that the flow segment sequence number 7 of the first packet is less than the flow segment sequence number 0 of the second packet.

In another implementation of this embodiment of this application, when the second node adds the corresponding flow segment sequence numbers to the packets in descending manner, that the first node determines, based on the first comparison result, whether the packet flow is out of order may be specifically implemented as follows: For example, when the flow segment sequence number of the second packet is greater than the flow segment sequence number of the first packet, the first node determines that the packet flow is out of order. This is because when the flow segment sequence number of the second packet is greater than the flow segment sequence number of the first packet, it indicates that a sequence in which the first node receives the first packet and the second packet is inconsistent with the sequence in which the second node sends the first packet and the second packet. When the flow segment sequence number of the second packet is less than or equal to the flow segment sequence number of the first packet, the first node determines that the packet flow is not out of order. This is because when the flow segment sequence number of the second packet is equal to the flow segment sequence number of the first packet, it indicates that the first packet and the second packet belong to the same flow segment; when the flow segment sequence number of the second packet is less than the flow segment sequence number of the first packet, it indicates that a sequence in which the first node receives the first packet and the second packet is consistent with the sequence in which the second node sends the first packet and the second packet.

As described above, the flow segment sequence number may be represented by, for example, several N bits, and a maximum value that can be represented by the N bits is definite, namely, 2N−1. When the flow segment sequence number reaches a minimum value 0 that can be represented by the several bits, the flow segment sequence number decreases again from 2N−1. For example, the flow segment sequence number is represented by three bits, and a minimum value that can be represented by the three bits is 0. After the flow segment sequence number reaches 0, the flow segment sequence number decreases again from 7. It may be understood that, if the second node consecutively sends eight flow segments, flow segment sequence numbers corresponding to the eight flow segments in a flow segment sending sequence are 6-5-4-3-2-1-0-7. When the first node receives the $1^{st}$ second packet that corresponds to the flow segment sequence number 7, a flow segment sequence number that is of a first packet and that is carried in a previous received packet (for example, the last first packet that corresponds to the flow segment sequence number 0) is 0, and the flow segment sequence number that is of the second packet and that is carried in the second packet is 7. In this case, although the first node compares the flow segment sequence number 0 of the first packet with the flow segment sequence number 7 of the second packet, a comparison result obtained by the first node is still that the flow segment sequence number 0 of the first packet is greater than the flow segment sequence number 7 of the second packet.

In actual application, the second node may store the flow segment forwarding entry shown in Table 1. Before sending a packet to the first node, the second node may search for a corresponding flow segment forwarding entry based on information such as a 2-tuple, a 5-tuple, or a 7-tuple carried in the packet. If the corresponding flow segment forwarding entry is found, the second node may modify a value of a corresponding flow segment sequence number field, further carry the flow segment forwarding entry in the packet, and then forward the packet based on "Path" in the flow segment forwarding entry. If the corresponding flow segment forwarding entry is not found, the second node may generate a corresponding flow segment forwarding entry, and further complete packet forwarding. It should be noted that a manner of determining the path in the flow segment forwarding entry that is generated by the second node is not specifically limited in this embodiment of this application. For example, the second node may determine a path from a plurality of reachable paths randomly or according to a corresponding rule, and use the path as the path in the flow segment forwarding entry.

It may be understood that storage of the flow segment forwarding entry needs to occupy storage space of the second node. To save the storage space of the second node, if the second node does not obtain, within a relatively long time period, a packet that matches the stored flow segment forwarding entry, the second node deletes the corresponding forwarding entry. Specifically, in addition to the fields shown in Table 1, the flow segment forwarding entry stored in the second node may further include a time field indicating latest time when the matching packet is obtained. In other words, after obtaining the packet that matches the stored flow segment forwarding entry, the second node may determine a value of the foregoing time field as obtaining time of the packet. When determining that a time interval between a current moment and the time indicated by the foregoing time field is greater than or equal to an entry deletion time threshold, the second node may delete the flow segment forwarding entry.

It may be understood that after the flow segment forwarding entry is deleted, a corresponding flow segment sequence number in the flow segment forwarding entry is also correspondingly deleted. In this embodiment of this application, the flow segment sequence number is a basis for determining whether the packet flow is out of order. After the flow segment forwarding entry is deleted, if the second node once more obtains a packet (a matching packet for short) that can match the flow segment forwarding entry, the second node needs to regenerate the flow segment forwarding entry for the matching packet, and correspondingly re-determine the flow segment sequence number corresponding to the packet. In this case, whether the packet flow is out of order may not be accurately determined based on the flow segment sequence number of the matching packet and a flow segment sequence number of a previous packet. For example, when the second node adds the corresponding flow segment sequence number to the packets in ascending manner, the flow segment sequence number generated by the second node for the matching packet is 1, and the flow segment sequence number generated by the second node for the previous packet of the matching packet is 3, although 1 is less than 3, the packet flow is actually not out of order. Therefore, if whether the packet flow is out of order is determined based only on the first comparison result, a determining result may be inaccurate.

To avoid this case, in an implementation of this embodiment of this application, the second packet may further carry a first identifier, and a value of the first identifier is used to indicate whether the second packet belongs to the $1^{st}$ flow segment of a subflow of the packet flow. The subflow mentioned herein may be considered as a subset of a flow. When obtaining the $1^{st}$ packet of the subflow, the second node may generate a corresponding flow segment forwarding entry for the packet. Correspondingly, the first node may determine, with reference to the first comparison result and the first identifier, whether the packet flow is out of order.

For the first identifier, it should be noted that, similar to the flow segment sequence number of the second packet, the first identifier may also be carried in the flow segment forwarding entry of the second packet.

As described above, if the second node does not obtain, within a long time period, the packet that matches the stored flow segment forwarding entry, the second node deletes the corresponding forwarding entry. When the second node sends packets to the first node, a time interval between a last packet in a previous subflow and the $1^{st}$ packet in a subsequent subflow is relatively large. Therefore, it may be considered that the previous subflow and the subsequent subflow are not out of order. In other words, if a packet belongs to the $1^{st}$ flow segment of a subflow of a packet flow, the packet is definitely not out of order.

In view of this, in an implementation of this embodiment of this application, if the second node adds the corresponding flow segment sequence number to the packets in ascending manner, that the first node determines, with reference to the first comparison result and the first identifier, whether the packet flow is out of order may be specifically as follows: When the flow segment sequence number of the second packet is less than the flow segment sequence number of the first packet, and the value of the first identifier indicates that the second packet does not belong to the $1^{st}$ flow segment of the subflow of the packet flow, the first node determines that the packet flow is out of order. Correspondingly, if the second node adds the corresponding flow segment sequence numbers to the packets in descending manner, that the first node determines, with reference to the first comparison result and the first identifier, whether the packet flow is out of order may be specifically as follows: When the flow segment sequence number of the second packet is greater than the flow segment sequence number of the first packet, and the value of the first identifier indicates that the second packet does not belong to the 1$^{st}$ flow segment of the subflow of the packet flow, the first node determines that the packet flow is out of order.

It may be understood that, in actual application, when flow segments are transmitted in a load balancing manner, an effect of the load balancing may need to be evaluated, or a transmission manner of the packet flow may be further adjusted based on a current effect of the load balancing. A quantity of times that the packet flow is out of order may be used as an indicator for evaluating the effect of the load balancing. In view of this, in an implementation of this embodiment of this application, the first node may further count the quantity of times that the packet flow is out of order, and send the quantity of times that the packet flow is out of order to the second node or a controller, so that the second node or the controller evaluates the effect of the load balancing based on the quantity of times that the packet flow is out of order.

In this embodiment of this application, that the first node counts the quantity of times that the packet flow is out of order may be specifically implemented as follows: When a result determined in step 104 is that the packet flow is out of order, the quantity of times that the packet flow is out of order is increased by 1; otherwise, the quantity of times that the packet flow is out of order is kept unchanged.

In another implementation of this embodiment of this application, efficiency of generating flow segments by the second node also affects an effect of load balancing to some extent. The efficiency of generating the flow segments refers to efficiency of obtaining the flow segments by dividing the packet flow by the second node. Usually, higher efficiency of generating the flow segments by the second node indicates a better corresponding effect of load balancing, and lower efficiency of generating the flow segments by the second node indicates a worse corresponding effect of load balancing. In view of this, in this embodiment of this application, the first node may further count a quantity of flow segments of the packet flow that are received within unit time, and send the counted quantity of flow segments of the packet flow to the second node or the controller, so that the second node or the controller determines, based on the quantity of flow segments, efficiency of generating flow segments by the second node or the controller. In this embodiment of this application, the second node may count, based on flow segment sequence numbers carried in received packets, the quantity of flow segments of the packet flow that are received within unit time.

As described above, it can be learned from a definition of a flow segment that, when the second node obtains flow segments through division, there is an important indicator, namely, a time interval between adjacent packets. For ease of description, the time interval is referred to as a time interval of flow segments. It may be understood that, a larger time interval of the flow segments indicates a larger time interval between the last packet of a previous flow segment and the 1$^{st}$ packet of a subsequent flow segment, and indicates a lower probability of out-of-order packets when the flow segments are transmitted in a load balancing manner. In view of this, in an implementation of this embodiment of this application, the first node may not only count the quantity of times that the packet flow is out of order, but may also adjust the time interval of the flow segments with reference to the quantity of times that the packet flow is out of order, and further send the adjusted time interval of the flow segments to the second node, so that the second node divides the packet flow into the flow segments based on the adjusted time interval of the flow segments. For ease of description, the "adjusted time interval of the flow segments" is referred to as a "target time interval of the flow segments".

This embodiment of this application does not specifically limit a specific implementation of determining the target time interval of the flow segments based on the quantity of times that the packet flow is out of order. In an example, it is considered that the quantity of times that the packet flow is out of order is related to a flow segment time interval corresponding to flow segments currently obtained through division by the second node. For ease of description, the flow segment time interval corresponding to the flow segments currently obtained through division by the second node is referred to as a preset time interval. Therefore, the first node may adjust the preset time interval based on the foregoing quantity of times that the packet flow is out of order, to obtain the target time interval. For example, if the foregoing quantity of times that the packet flow is out of order is very small, a constant may be subtracted from the preset time interval, or the preset time interval is multiplied by a coefficient less than 1, to obtain the target time interval.

For the foregoing preset time interval, it should be noted that the first node may obtain the preset time interval from the second node. In an example, the first node may send an obtaining request to the second node, and after receiving the obtaining request, the second node may send the preset time interval to the first node.

In another example, it is considered that an out-of-order rate of the packet flow is an important indicator for measuring the effect of the load balancing, and the out-of-order rate of the packet flow is also related to the preset time interval. Therefore, the first node may further count a quantity of times that the packet flow is not out of order, then calculate the out-of-order rate of the packet flow based on the quantity of times that the packet flow is out of order and the quantity of times that the packet flow is not out of order, and adjust the preset time interval based on the out-of-order rate, to obtain the target time interval. Specifically, the first node may compare the calculated out-of-order rate with a preset out-of-order rate to obtain a second comparison result, and then calculate the target time interval of the flow segments of the packet flow based on the second comparison result and the preset time interval.

It should be noted that the preset out-of-order rate may be understood as an out-of-order rate that can be tolerated in the load balancing. When the out-of-order rate obtained through calculation is greater than the preset out-of-order rate, it indicates that an out-of-order rate of flow segments currently transmitted in a load balancing manner is relatively high. Therefore, a time interval of the flow segments may be correspondingly increased, in other words, a time interval greater than the preset time interval is determined as the target time interval, to reduce the out-of-order rate in transmission of the packet flow. For example, the preset time interval may be multiplied by a coefficient greater than 1, to obtain the target time interval. When the out-of-order rate obtained through calculation is less than the preset out-of-order rate, it indicates that an out-of-order rate of flow segments currently transmitted in a load balancing manner is relatively low. Therefore, a time interval of the flow segments may be correspondingly reduced, in other words, a time interval smaller than the preset time interval is determined as the target interval, to further improve the effect of the load balancing. For example, the preset time interval may be multiplied by a coefficient less than 1, to obtain the target time interval.

It should be noted that, that the first node counts the quantity of times that the packet flow is not out of order may be specifically implemented as follows: When a result determined in step 104 is that the packet flow is not out of order, the quantity of times that the packet flow is not out of order is increased by 1; otherwise, the quantity of times that the packet flow is not out of order is kept unchanged. An out-of-order rate of packets may be obtained by calculating a ratio of a quantity of times that the packets are out of order to a total quantity of the packets, where the total quantity of the packets is a sum of the quantity of times that the packets are out of order and a quantity of times that the packets are not out of order.

In addition, it may be understood that a higher quantity of the flow segments received by the first node within unit time indicates a smaller preset time interval used by the second node to divide the packet flow into a plurality of flow segments, and also indicates a relatively high probability that the packet flow is out of order; and vice versa. Therefore, when the quantity of times that packet flow is out of order is relatively high, and the quantity of the flow segments received by the first node within unit time is also relatively high, a time interval between the flow segments may be reduced; and vice versa.

Specifically, the first node may count the quantity of the flow segments of the packet flow that are received in the unit time, then compare a preset quantity with the counted quantity of the flow segments of the packet flow, to obtain a third comparison result, and calculate the target time interval with reference to the quantity of times that the packet flow is out of order and the third comparison result.

A specific implementation of "calculating the target time interval with reference to the quantity of times that the packet flow is out of order and the third comparison result" is not specifically limited in this embodiment of this application. In an example, the target time interval may be determined based on the quantity of times that the packet flow is out of order and the third comparison result. For example, if the quantity of times that the packet flow is out of order is less than a preset threshold, and the third comparison result indicates that the counted quantity of flow segments is less than the preset quantity, the preset time interval may be multiplied by a coefficient less than 1, to obtain the target time interval; otherwise, the preset time interval is multiplied by a coefficient greater than 1, to obtain the target time interval.

The foregoing describes the packet flow out-of-order detection method performed by the first node provided in this embodiment of this application. The following describes a packet processing method performed by the second node.

FIG. 3 is a signaling exchange diagram of a packet processing method according to an embodiment of this application.

The packet processing method provided in this embodiment of this application may be implemented, for example, according to the following steps 201 to 204.

Step 201: A second node obtains a first packet, where the first packet carries a flow segment sequence number of the first packet.

In this embodiment of this application, the second node may obtain the first packet from another device, or the second node may generate the first packet. This is not specifically limited in this embodiment of this application.

In this embodiment of this application, the first packet carries the flow segment sequence number of the first packet, and the flow segment sequence number of the first packet is used to indicate a sequence number of a flow segment to which the first packet belongs. Specifically, the second node may generate the flow segment sequence number of the first packet according to a specific rule. For example, the flow segment sequence number of the first packet may be determined as an initial sequence number. A value of the initial sequence number is not specifically limited in this embodiment of this application. For example, the value of the initial sequence number may be 1, or may be another value. In this embodiment of this application, the second node may determine a flow segment forwarding entry corresponding to the first packet, and then include the flow segment sequence number of the first packet in the flow segment forwarding entry corresponding to the first packet. For a meaning of the flow segment sequence number and a description of the flow segment forwarding entry, refer to a related description part in the foregoing embodiment. Details are not described herein again.

Step 202: The second node sends the first packet to a first node.

The second node may send the first packet to the first node based on the flow segment forwarding entry corresponding to the first packet.

Step 203: The second node obtains a second packet, where the second packet carries a flow segment sequence number of the second packet.

In this embodiment of this application, the second node may obtain the second packet from another device, or the second node may generate the second packet. This is not specifically limited in this embodiment of this application.

In this embodiment of this application, the second packet carries the flow segment sequence number of the second packet, and the flow segment sequence number of the second packet is used to indicate a sequence number of a flow segment to which the second packet belongs. In this embodiment of this application, when the second packet and the first packet belong to a same packet flow, the flow segment sequence number of the second packet is determined based on a time interval between the second packet and the first packet.

Specifically, the second node may determine, based on information such as a 2-tuple, a 5-tuple, or a 7-tuple carried in the first packet and information such as a 2-tuple, a 5-tuple, or a 7-tuple carried in the second packet, whether the first packet and the second packet belong to the same packet flow. After determining that the second packet and the first packet belong to the same packet flow, the second node may determine, based on a time interval between the first packet and the second packet that are obtained by the second node, whether the first packet and the second packet belong to a same flow segment, and further determine the flow segment sequence number of the second packet based on a determining result.

After determining the flow segment sequence number of the second packet, the second node may include the flow segment sequence number of the second packet in the second packet. Similar to including the flow segment sequence number of the first packet in the first packet by the second node, after obtaining the second packet, the second node may determine a flow segment forwarding entry corresponding to the second packet, and then include the flow segment sequence number of the second packet in the flow segment forwarding entry corresponding to the second packet.

Step 204: The second node sends the second packet to the first node.

The second node may send the second packet to the first node based on the flow segment forwarding entry corresponding to the second packet. After receiving the first packet and the second packet, the first node may perform the packet flow out-of-order detection method corresponding to FIG. 2 provided in the foregoing embodiment.

It may be understood that the flow segment sequence number of the first packet is used to indicate the sequence number of the flow segment to which the first packet belongs. The flow segment sequence number of the second packet is used to indicate the sequence number of the flow segment to which the second packet belongs. If the first packet and the second packet belong to the same flow segment, the flow segment sequence number of the first packet is equal to the flow segment sequence number of the second packet. In other words, when the second node determines the flow segment sequence number of the second packet based on the time interval between the second packet and the first packet, if the second node determines that the time interval between the second packet and the first packet is less than or equal to a first preset time interval, the second node determines the flow segment sequence number of the first packet as the flow segment sequence number of the second packet. That the time interval between the second packet and the first packet is less than or equal to a first preset time interval indicates that the first packet and the second packet belong to the same flow segment. The first preset time interval is not specifically limited in this embodiment of this application, and the first preset time interval may be determined based on an actual situation.

It may be understood that if the time interval between the second packet and the first packet is greater than the foregoing first preset time interval, it indicates that the first packet and the second packet belong to different flow segments. In this case, whether the first packet and the second packet belong to a same subflow needs to be further considered. For a concept of a subflow, refer to the foregoing description. Details are not described herein again. Whether the second packet and the first packet belong to the same subflow depends on a value relationship between a second preset time interval and a time interval between the second packet and the first packet that are obtained by the second node. As described above, the flow segment sequence number of the second packet is carried in the flow segment forwarding entry corresponding to the second packet, and the flow segment forwarding entry is stored in the second node. When the second node does not obtain a packet that matches the forwarding entry for a relatively long time, the second node deletes the flow segment forwarding entry. In other words, if the time interval between the second packet and the first packet is relatively long and is greater than the second preset time interval, the second node needs to regenerate the flow segment forwarding entry corresponding to the second packet. In this case, the second packet and the first packet belong to different subflows. On the contrary, if the time interval between the second packet and the first packet is less than or equal to the second preset time interval, the first packet and the second packet are determined to belong to the same subflow.

In this embodiment of this application, if the second packet and the first packet belong to the same subflow of the packet flow, the flow segment sequence number of the second packet may be determined based on the flow segment sequence number of the first packet. Specifically, the second node may determine the flow segment sequence number of the second packet based on the flow segment sequence number of the first packet. Specifically, the second node may determine, based on the flow segment sequence number of the first packet, a value that is not equal to the flow segment sequence number of the first packet, and use the value as the flow segment sequence number of the second packet. For example, the second node may determine the flow segment sequence number of the second packet based on the flow segment sequence number of the first packet in ascending manner of flow segment sequence numbers. For another example, the second node may determine the flow segment sequence number of the second packet based on the flow segment sequence number of the first packet in descending manner of flow segment sequence numbers. This is not limited.

In this case, the second node may further include a first identifier in the second packet, where a value of the first identifier is used to indicate that the second packet and an adjacent previous packet, namely, the first packet, belong to the same subflow but different flow segments. The first identifier mentioned herein may alternatively be carried in the flow segment forwarding entry corresponding to the second packet. In other words, the second packet may further carry the first identifier used to indicate that the second packet and the adjacent previous packet belong to the same subflow but different flow segments.

If the second packet and the first packet belong to different subflows of the packet flow, because the flow segment sequence number of the first packet has been deleted, the second node cannot obtain the flow segment sequence number corresponding to the first node. In this case, in this embodiment of this application, the flow segment sequence number of the second packet may be determined according to a preset rule. In other words, the second node may determine the flow segment sequence number of the second packet according to the preset rule. The preset rule is not specifically limited in this embodiment of this application, and the preset rule may be determined based on an actual situation. For example, a sequence number may be randomly generated as the flow segment sequence number corresponding to the second packet. For another example, the initial sequence number may be determined as the flow segment sequence number corresponding to the second packet.

It may be understood that, in this case, because a value relationship between the flow segment sequence number of the second packet and the flow segment sequence number of the first packet is irregular, the first node may not determine, based on the method shown in FIG. 2, whether the packet flow is out of order. To enable the first node to accurately determine whether the packet flow is out of order, in an implementation of this embodiment of this application, the second packet may further carry a second identifier, and a value of the second identifier is used to indicate that the second packet belongs to the $1^{st}$ flow segment of a subflow of the packet flow. Specifically, the second node may include the second identifier in the second packet, and the value of the second identifier is used to indicate that the second packet belongs to the $1^{st}$ flow segment of the subflow of the packet flow. It should be noted that the second preset time interval is a relatively large value, and is greater than the first preset time interval. The second preset time interval may be considered as a basis for subflow division. Usually, the last flow segment in a previous subflow and the $1^{st}$ flow segment in a subsequent subflow are not out of order. The foregoing second preset time interval is not specifically limited in this embodiment of this application. In actual application, if there are a plurality of paths between the second node and the first node, and a time interval between moments at which the second node sends two packets to the first node is greater than or equal to a maximum value in delays corresponding to each of the plurality of paths, the two packets are definitely not out of order. This is because when a previous packet has reached the first node, the second node has not started to send a subsequent packet. Therefore, in an implementation of this embodiment of this application, the foregoing second preset time interval is greater than or equal to the maximum value in the delays corresponding to each of the plurality of paths from the second node to the first node.

It may be understood that, in actual application, the $1^{st}$ flow segment of the subflow may include a plurality of packets. In this case, in this embodiment of this application, if the second node determines that the second packet belongs to the $1^{st}$ flow segment of the subflow of the packet flow, for another obtained packet, for example, a third packet, corresponding to a time interval that is between the another packet and the second packet and that is less than the first preset time interval, the third packet carries a flow segment sequence number of the third packet and a third identifier, where the flow segment sequence number of the third packet is equal to the flow segment sequence number of the second packet, and a value of the third identifier indicates that the third packet belongs to the $1^{st}$ flow segment of the subflow of the packet flow. Specifically, the second node may determine the flow segment sequence number of the second packet as the flow segment sequence number of the third packet, and include the flow segment sequence number of the third packet in the third packet. In addition, the second node includes, in the third packet, the third identifier indicating that the third packet is a packet of the $1^{st}$ flow segment of the subflow of the packet flow.

For the foregoing first identifier, the second identifier, and the third identifier, it should be noted that the first identifier, the second identifier, and the third identifier may be essentially considered as identifiers of the $1^{st}$ flow segment of the subflow. In actual application, a field may be newly added to the flow segment forwarding entry shown in Table 1. A value of the field is used to indicate whether a current packet belongs to the $1^{st}$ flow segment of the subflow of the packet flow. For example, if the value of the field in the flow segment forwarding entry corresponding to the second packet is 1, it indicates that the second packet belongs to the $1^{st}$ flow segment of the subflow of the packet flow; if the value of the field in the flow segment forwarding entry corresponding to the second packet is 0, it indicates that the second packet does not belong to the $1^{st}$ flow segment of the subflow of the packet flow. Correspondingly, if the value of the field in a flow segment forwarding entry corresponding to the third packet is 1, it indicates that the third packet belongs to the $1^{st}$ flow segment of the subflow of the packet flow; if the value of the field in a flow segment forwarding entry corresponding to the third packet is 0, it indicates that the third packet does not belong to the $1^{st}$ flow segment of the subflow of the packet flow. The flow segment forwarding entry after the field is newly added may be shown in the following Table 2.

TABLE 2

| Key | Path | FlowletSeq | Sub-flow |
| --- | --- | --- | --- |

The "Sub-flow" is a subflow identifier, and the first identifier, the second identifier, and the third identifier may all be carried in the field.

For meanings of the key field, the path field, and the FlowletSeq field, refer to the foregoing description of Table 1. Details are not described herein again.

Certainly, in actual application, the first identifier, the second identifier, and the third identifier may respectively correspond to one field in the flow segment forwarding entry, or may be all or respectively carried in another field of the packets. This is not specifically limited in this embodiment of this application, and descriptions are not enumerated herein again.

It may be understood that the flow segments are obtained by the second node through division, and a flow segment division manner affects an effect of transmitting the flow segments in a load balancing manner. Therefore, in this embodiment of this application, the second node may further adjust the flow segment division manner. Specifically, the second node may obtain the target time interval of the flow segments of the packet flow, and divide the packet flow into a plurality of flow segments based on the target time interval of the flow segments of the packet flow.

A specific implementation in which the second node obtains the target time interval is not specifically limited in this embodiment of this application. In an example, the second node may obtain the target time interval from the first node. For a specific implementation in which the first node determines the target time interval, refer to the description part of related content in the foregoing embodiment. Details are not described herein again. In still another example, the second node may obtain the target time interval through calculation. In still another example, a controller may obtain the target time interval through calculation. Correspondingly, the second node may obtain the target time interval from the controller.

It should be noted that a manner in which the second node and the controller calculate the target time interval is similar to a principle in which the first node calculates the target time interval. The target time intervals are both calculated based on a quantity of times that the packet flow is out of order. Alternatively, the target time intervals are both calculated based on a quantity of times that the packet flow is out of order and a quantity of times that the packet flow is not out of order. Alternatively, the target time intervals are both calculated based on a quantity of times that the packet flow is out of order and a quantity of flow segments of the packet flow that are received by the first node within unit time. The only difference is that, when the second node calculates the target time interval, the first node may send the quantity of times that the packet flow is out of order to the second node, and the second node obtains the target time interval through calculation. Alternatively, the first node may send the quantity of times that the packet flow is out of order and the quantity of times that the packet flow is not out of order to the second node, and the second node obtains the target time interval through calculation. Alternatively, the first node may send the quantity of times that the packet flow is out of order and the quantity of flow segments of the packet flow that are received by the first node within the unit time to the second node, and the second node obtains the target time interval through calculation. Correspondingly, when the controller calculates the target time interval, the first node may send the quantity of times that the packet flow is out of order to the controller, and the controller obtains the target time interval through calculation. Alternatively, the first node may send the quantity of times that the packet flow is out of order and the quantity of times that the packet flow is not out of order to the controller, and the controller obtains the target time interval through calculation. Alternatively, the first node may send the quantity of times that the packet flow is out of order and the quantity of flow segments of the packet flow that are received by the first node within the unit time to the controller, and the controller obtains the target time interval through calculation.

The following separately briefly describes specific implementations in which the second node calculates the target time interval and the controller calculates the target time interval. For a specific calculation process and a principle, refer to the foregoing description part in which the first node calculates the target time interval.

First, a specific implementation in which the second node calculates the target time interval is described.

Specifically, in an implementation of this embodiment of this application, the second node may receive, from the first node, the quantity of times that the packet flow is out of order, and then the second node calculates the target time interval of the flow segments of the packet flow based on the quantity of times that the packet flow is out of order.

In another implementation of this embodiment of this application, the second node may further receive, from the first node, the quantity of times that the packet flow is not out of order. Further, the second node may calculate an out-of-order rate of the packet flow based on the quantity of times that the packet flow is out of order and the quantity of times that the packet flow is not out of order. Then, the second node compares the out-of-order rate of the packet flow with a preset out-of-order rate, to obtain a first comparison result. Finally, the second node calculates the target time interval of the flow segments of the packet flow based on a second comparison result and the first preset time interval. The first preset time interval mentioned herein is a same concept as the preset time interval mentioned in the foregoing embodiment, and both refer to "a sending time interval between adjacent packets" corresponding to flow segments currently generated by the second node.

In still another implementation of this embodiment of this application, after the second node obtains the quantity of flow segments of the packet flow that are received from the first node within the unit time, the second node compares the quantity of flow segments of the packet flow with a preset quantity, to obtain a second comparison result. The second node then calculates the target time interval of the flow segments of the packet flow based on the quantity of times that the packet flow is out of order and the second comparison result.

Then, a specific implementation in which the controller calculates the target time interval is described.

Specifically, in an implementation of this embodiment of this application, the controller may receive, from the first node, the quantity of times that the packet flow is out of order, and then the controller calculates the target time interval of the flow segments of the packet flow based on the quantity of times that the packet flow is out of order.

In another implementation of this embodiment of this application, the controller may further receive, from the first node, the quantity of times that the packet flow is not out of order. Further, the controller may calculate an out-of-order rate of the packet flow based on the quantity of times that the packet flow is out of order and the quantity of times that the packet flow is not out of order. Then, the controller compares the out-of-order rate of the packet flow with a preset out-of-order rate, to obtain a first comparison result. Finally, the controller calculates the target time interval of the flow segments of the packet flow based on a second comparison result and a first preset time interval. The first preset time interval mentioned herein is a same concept as the preset time interval mentioned in the foregoing embodiment, and both refer to "a sending time interval between adjacent packets" corresponding to flow segments currently generated by the controller.

In still another implementation of this embodiment of this application, after the controller obtains the quantity of flow segments of the packet flow that are received from the first node within the unit time, the controller compares the quantity of flow segments of the packet flow with a preset quantity, to obtain a second comparison result. The controller then calculates the target time interval of the flow segments of the packet flow based on the quantity of times that the packet flow is out of order and the second comparison result.

Based on the packet flow out-of-order detection method performed by the first node, the packet processing method performed by the second node, and the packet processing method performed by the controller that are provided in the foregoing embodiments, this embodiment of this application further provides corresponding apparatuses. The apparatuses are described below with reference to the accompanying drawings.

Figure 4:
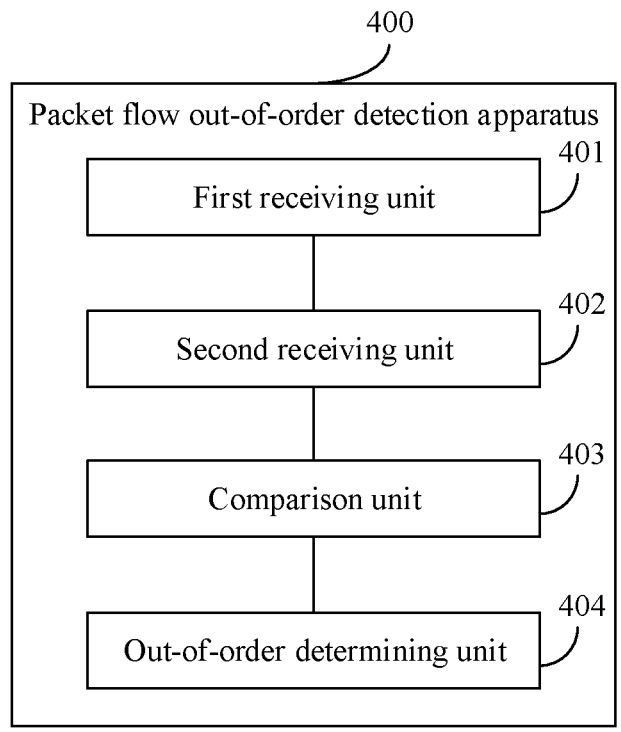
FIG. 4 is a schematic diagram of a structure of a packet flow out-of-order detection apparatus according to an embodiment of this application.

FIG. 4 is a schematic diagram of a structure of a packet flow out-of-order detection apparatus 400 according to an embodiment of this application.

The packet flow out-of-order detection apparatus 400 shown in FIG. 4 is configured to perform the steps performed by the first node in the foregoing embodiment, for example, perform the steps performed by the first node shown in FIG. 2.

The packet flow out-of-order detection apparatus 400 provided in this embodiment of this application may specifically include, for example, a first receiving unit 401, a second receiving unit 402, a comparison unit 403, and an out-of-order determining unit 404.

The first receiving unit 401 is configured to receive a first packet from a second node, where the first packet includes a flow segment sequence number of the first packet.

The second receiving unit 402 is configured to: after receiving the first packet, receive a second packet from the second node, where the second packet includes a flow segment sequence number of the second packet, and the first packet and the second packet belong to a same packet flow.

The comparison unit 403 is configured to compare the flow segment sequence number of the first packet with the flow segment sequence number of the second packet, to obtain a first comparison result.

The out-of-order determining unit 404 is configured to determine, based on the first comparison result, whether the packet flow is out of order.

In an implementation, the out-of-order determining unit 404 is specifically configured to:
   when the flow segment sequence number of the second packet is less than the flow segment sequence number of the first packet, determine that the packet flow is out of order.

In an implementation, the second packet further includes a first identifier, and a value of the first identifier indicates whether the second packet belongs to the $1^{st}$ flow segment of a subflow of the packet flow.

The out-of-order determining unit 404 is specifically configured to:
   determine, based on the first comparison result and the value of the first identifier, whether the packet flow is out of order.

In an implementation, the out-of-order determining unit 404 is specifically configured to:

when the flow segment sequence number of the second packet is less than the flow segment sequence number of the first packet, and the value of the first identifier indicates that the second packet does not belong to the $1^{st}$ flow segment of the subflow of the packet flow, determine that the packet flow is out of order.

In an implementation, the apparatus further includes:
a first counting unit, configured to count a quantity of times that the packet flow is out of order; and
a first sending unit, configured to send the quantity of times that the packet flow is out of order to the second node or a controller.

In an implementation, the apparatus further includes:
a second counting unit, configured to count a quantity of flow segments of the packet flow that are received within unit time; and
a second sending unit, configured to send the quantity of flow segments of the packet flow to the second node or the controller.

In an implementation, the apparatus further includes:
a third counting unit, configured to count a quantity of times that the packet flow is out of order;
a first calculation unit, configured to calculate a target time interval of flow segments of the packet flow based on the quantity of times that the packet flow is out of order; and
a third sending unit, configured to send the target time interval to the second node.

In an implementation, the first calculation unit is specifically configured to:
count a quantity of times that the packet flow is not out of order;
obtain a preset time interval of the flow segments into which the second node divides the packet flow;
calculate an out-of-order rate of the packet flow based on the quantity of times that the packet flow is out of order and the quantity of times that the packet flow is not out of order;
compare the out-of-order rate of the packet flow with a preset out-of-order rate, to obtain a second comparison result; and
calculate the target time interval of the flow segments of the packet flow based on the second comparison result and the preset time interval.

In an implementation, the first calculation unit is specifically configured to:
count a quantity of flow segments of the packet flow that are received within unit time;
compare the quantity of flow segments of the packet flow with a preset quantity, to obtain a third comparison result; and
calculate the target time interval of the flow segments of the packet flow based on the quantity of times that the packet flow is out of order and the third comparison result.

The apparatus 400 is an apparatus corresponding to the packet flow out-of-order detection method provided in the foregoing method embodiment and performed by the first node, and specific implementation of each unit of the apparatus 400 is a same concept as that of the foregoing method embodiment. Therefore, for specific implementation of each unit of the apparatus 400, refer to the description part of the packet flow out-of-order detection method performed by the first node in the foregoing method embodiment. Details are not described herein again.

Figure 5:
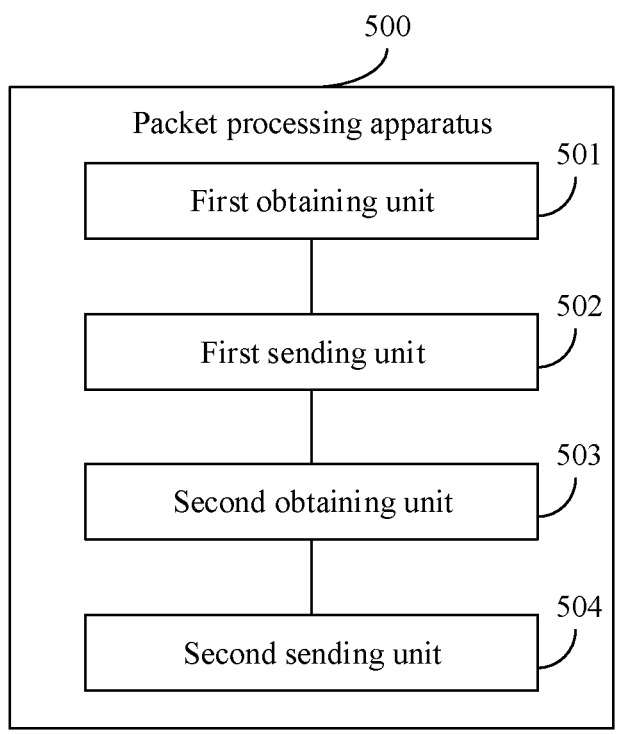
FIG. 5 is a schematic diagram of a structure of a packet processing apparatus according to an embodiment of this application.

FIG. 5 is a schematic diagram of a structure of a packet processing apparatus 500 according to an embodiment of this application.

The packet flow processing apparatus 500 shown in FIG. 5 is configured to perform the steps performed by the second node in the foregoing embodiment, for example, perform the steps performed by the second node shown in FIG. 3.

The packet processing apparatus 500 provided in this embodiment of this application may specifically include, for example, a first obtaining unit 501, a first sending unit 502, a second obtaining unit 503, and a second sending unit 504.

The first obtaining unit 501 is configured to obtain a first packet, where the first packet carries a flow segment sequence number of the first packet, and the flow segment sequence number of the first packet indicates a sequence number of a flow segment to which the first packet belongs.

The first sending unit 502 is configured to send the first packet to a first node.

The second obtaining unit 503 is configured to: after the first packet is obtained, obtain a second packet, where the second packet carries a flow segment sequence number of the second packet, and the flow segment sequence number of the second packet indicates a sequence number of a flow segment to which the second packet belongs, where when the second packet and the first packet belong to a same packet flow, the flow segment sequence number of the second packet is determined based on a time interval between the second packet and the first packet.

The second sending unit 504 is configured to send the second packet to the first node.

In an implementation,
when the time interval between the second packet and the first packet is less than or equal to a first preset time interval, the flow segment sequence number of the second packet is the flow segment sequence number of the first packet.

In an implementation,
when the time interval between the second packet and the first packet is greater than a first preset time interval and less than a second preset time interval, the flow segment sequence number of the second packet is determined based on the flow segment sequence number of the second packet, and the flow segment sequence number of the second packet is not equal to the flow segment sequence number of the first packet.

In an implementation,
the second packet further carries a first identifier, and a value of the first identifier is used to indicate that the second packet and an adjacent previous packet belong to a same subflow but different flow segments.

In an implementation,
when the time interval between the second packet and the first packet is greater than or equal to a second preset time interval, the flow segment sequence number of the second packet is determined according to a preset rule; and
the second packet further carries a second identifier, and a value of the second identifier is used to indicate that the second packet is a packet of the $1^{st}$ flow segment of a subflow of the packet flow.

In an implementation, the apparatus further includes:
a third obtaining unit, configured to: after the second packet is obtained, obtain a third packet, where the third packet and the second packet belong to the same packet flow, and the third packet carries a flow segment sequence number of the third packet and a third identifier; and when the time interval between the third packet and the second packet that are obtained by the second node is less than or equal to a first preset time interval, the flow segment sequence number of the third packet is the same as the flow segment sequence number of the second packet, a value of the third identifier indicates that the third packet is a packet of the $1^{st}$ flow segment of the subflow of the packet flow, and the first preset time interval is less than the second preset time interval; and a third sending unit, configured to send the third packet to the first node.

In an implementation, the apparatus further includes:

a fourth obtaining unit, configured to obtain a target time interval of flow segments of the packet flow; and a flow segment division unit, configured to divide the packet flow into a plurality of flow segments based on the target time interval of the flow segments of the packet flow.

In an implementation, the fourth obtaining unit is specifically configured to:

receive, from the first node, a quantity of times that the packet flow is out of order; and calculate the target time interval of the flow segments of the packet flow based on the quantity of times that the packet flow is out of order.

In an implementation, the calculating the target time interval of the flow segments of the packet flow based on the quantity of times that the packet flow is out of order includes:

receiving, from the first node, a quantity of times that the packet flow is not out of order;

calculating an out-of-order rate of the packet flow based on the quantity of times that the packet flow is out of order and the quantity of times that the packet flow is not out of order;

comparing the out-of-order rate of the packet flow with a preset out-of-order rate, to obtain a first comparison result; and calculating the target time interval of the flow segments of the packet flow based on the first comparison result and the first preset time interval.

In an implementation, the calculating the target time interval of the flow segments of the packet flow based on the quantity of times that the packet flow is out of order includes:

obtaining, from the first node, a quantity of flow segments of the packet flow that are received within unit time;

comparing the quantity of flow segments of the packet flow with a preset quantity, to obtain a second comparison result; and calculating the target time interval of the flow segments of the packet flow based on the quantity of times that the packet flow is out of order and the second comparison result.

The apparatus 500 is an apparatus corresponding to the packet processing method provided in the foregoing method embodiment and performed by the second node, and specific implementation of each unit of the apparatus 500 is a same concept as that of the foregoing method embodiment. Therefore, for specific implementation of each unit of the apparatus 500, refer to the description part of the packet processing method performed by the second node in the foregoing method embodiment. Details are not described herein again.

Figure 6:
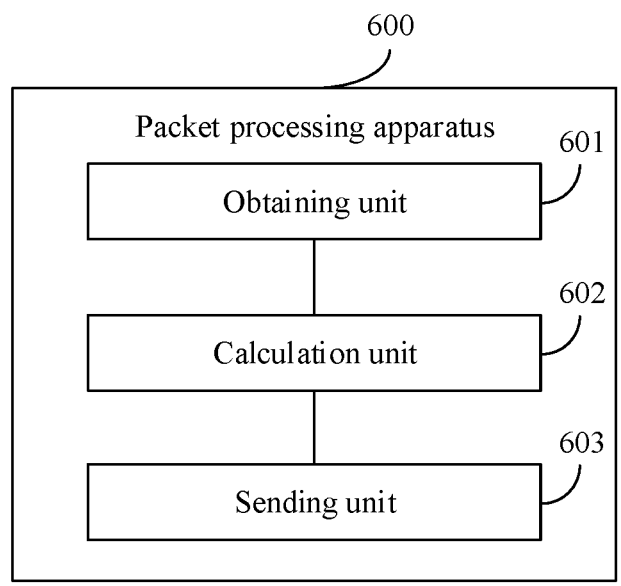
FIG. 6 is a schematic diagram of a structure of a packet processing apparatus according to an embodiment of this application.

FIG. 6 is a schematic diagram of a structure of a packet processing apparatus 600 according to an embodiment of this application.

The packet processing apparatus 600 shown in FIG. 6 is configured to perform the steps performed by the controller in the foregoing embodiment, for example, perform the step of calculating the target time interval.

The packet processing apparatus 600 provided in this embodiment of this application may specifically include, for example, an obtaining unit 601, a calculation unit 602, and a sending unit 603.

The obtaining unit 601 is configured to obtain a quantity of times that a packet flow received by a first node is out of order.

The calculation unit 602 is configured to calculate a target time interval of flow segments of the packet flow based on the quantity of times that the packet flow is out of order.

The sending unit 603 is configured to send the target time interval to a second node, where the target time interval is used for dividing the packet flow into a plurality of flow segments.

In an implementation, the calculation unit 602 is specifically configured to:

obtain a quantity of times that the packet flow received by the first node is not out of order;

obtain a preset time interval of the flow segments into which the second node divides the packet flow;

calculate an out-of-order rate of the packet flow based on the quantity of times that the packet flow is out of order and the quantity of times that the packet flow is not out of order;

compare the out-of-order rate of the packet flow with a preset out-of-order rate, to obtain a first comparison result; and calculate the target time interval of the flow segments of the packet flow based on the first comparison result and the preset time interval.

In an implementation, the calculation unit 602 is specifically configured to:

obtain a quantity of flow segments of the packet flow that are received by the first node within unit time;

compare the quantity of flow segments of the packet flow with a preset quantity, to obtain a second comparison result; and calculate the target time interval of the flow segments of the packet flow based on the quantity of times that the packet flow is out of order and the second comparison result.

The apparatus 600 is an apparatus corresponding to the steps that are provided in the foregoing method embodiments and performed by the controller, and specific implementation of each unit of the apparatus 600 is a same concept as that of the foregoing method embodiment. Therefore, for specific implementation of each unit of the apparatus 600, refer to the description part of the steps performed by the controller in the foregoing method embodiment. Details are not described herein again.

Correspondingly, an embodiment of this application further provides a packet out-of-order detection device corresponding to the packet out-of-order detection apparatus 400. The packet out-of-order detection device includes a processor and a memory. The memory is configured to store instructions. The processor is configured to execute the instructions in the memory, to perform the packet flow out-of-order detection method provided in the foregoing method embodiment and performed by a first node.

An embodiment of this application further provides a packet processing device corresponding to the packet processing apparatus 500. The packet processing device includes a processor and a memory. The memory is configured to store instructions. The processor is configured to execute the instructions in the memory, to perform the packet processing method provided in the foregoing method embodiment and performed by a second node.

An embodiment of this application further provides a packet processing device corresponding to the packet processing apparatus 600. The packet processing device includes a processor and a memory. The memory is configured to store instructions. The processor is configured to execute the instructions in the memory, to perform the packet processing method provided in the foregoing method embodiment and performed by a controller.

Figure 7:
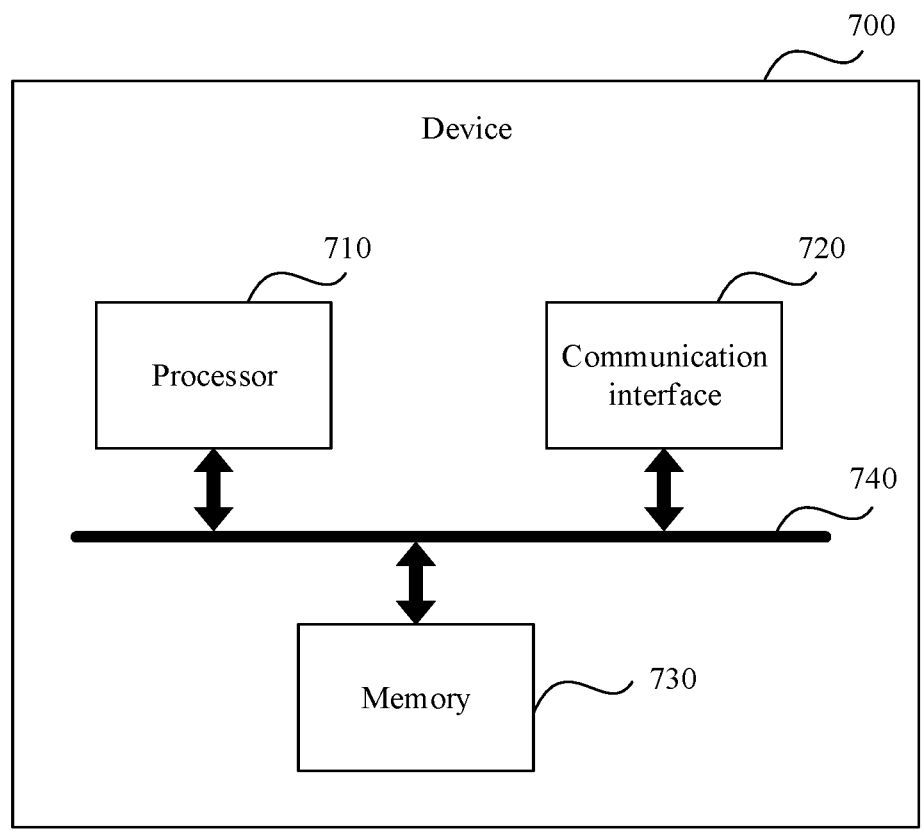
FIG. 7 is a schematic diagram of a structure of a device according to an embodiment of this application.

It should be noted that hardware structures of the packet out-of-order detection device corresponding to the packet out-of-order detection apparatus 400, the packet processing device corresponding to the packet processing apparatus 500, and the packet processing device corresponding to the packet processing apparatus 600 may all be a structure shown in FIG. 7. FIG. 7 is a schematic diagram of a structure of a device 700 according to an embodiment of this application.

Refer to FIG. 7. The device 700 includes a processor 710, a communication interface 720, and a memory 730. The device 700 may include one or more processors 710. In FIG. 7, one processor is used as an example. In this embodiment of this application, the processor 710, the communication interface 720, and the memory 730 may be connected by using a bus system or in another manner. In FIG. 7, a connection performed by using a bus system 740 is used as an example.

The processor 710 may be a central processing unit (CPU), a network processor (NP), or a combination of a CPU and an NP. The processor 710 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 730 may include a volatile memory, such as a random access memory (RAM). The memory 730 may also include a non-volatile memory, such as a flash memory, a hard disk drive (HDD), or a solid-state drive (SSD). The memory 730 may also include a combination of memories of the foregoing types.

The memory 730 may store a quantity of times that the packet flow is out of order, a quantity of times that the packet flow is not out of order, a quantity of flow segments of the packet flow that are received by the first node within unit time, a target time interval, and the like mentioned in the foregoing embodiment.

Optionally, the memory 730 stores an operating system and a program, an executable module or a data structure, a subset thereof, or an extended set thereof, where the program may include various operation instructions for implementing various operations. The operating system may include various system programs for implementing various basic services and processing hardware-based tasks. The processor 710 may read the program in the memory 730, to implement the packet flow out-of-order detection method provided in this embodiment of this application.

The bus system 740 may be a peripheral component interconnect (PCI) bus, an extended industry standard architecture (EISA) bus, or the like. The bus system 740 may be classified into an address bus, a data bus, a control bus, and the like. For ease of representation, only one thick line is used to represent the bus in FIG. 7, but this does not mean that there is only one bus or only one type of bus.

An embodiment of this application further provides a computer-readable storage medium including instructions. When the instructions are run on a computer, the computer is enabled to perform the packet flow out-of-order detection method provided in the foregoing method embodiment and performed by a first node.

An embodiment of this application further provides a computer-readable storage medium including instructions. When the instructions are run on a computer, the computer is enabled to perform the packet processing method provided in the foregoing method embodiment and performed by a second node.

An embodiment of this application further provides a computer-readable storage medium including instructions. When the instructions are run on a computer, the computer is enabled to perform the packet processing method provided in the foregoing method embodiment and performed by a controller.

An embodiment of this application further provides a computer program product including instructions. When the instructions are run on a computer, the computer is enabled to perform the packet flow out-of-order detection method provided in the foregoing method embodiment and performed by a first node.

An embodiment of this application further provides a computer program product including instructions. When the instructions are run on a computer, the computer is enabled to perform the packet processing method provided in the foregoing method embodiment and performed by a second node.

An embodiment of this application further provides a computer program product including instructions. When the instructions are run on a computer, the computer is enabled to perform the packet processing method provided in the foregoing method embodiment and performed by a controller.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in another order other than the order illustrated or described herein. In addition, the terms "include", "contain" and any other variants mean to cover the non-exclusive inclusion. For example, a process, method, system, product, or device that includes a list of steps or units is not necessarily limited to those units, but may include other units not expressly listed or inherent to such a process, method, product, or device.

It can be clearly understood by persons skilled in the art that, for a purpose of convenient and brief description, for detailed working processes of the foregoing system, apparatus, and unit, refer to corresponding processes in the foregoing method embodiments. Details are not described herein.

In the several embodiments provided in this application, it should be understood that the disclosed system, apparatus, and method may be implemented in other manners. For example, the described apparatus embodiment is merely an example. For example, division into units is merely logical module division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained depending on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module or unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for enabling a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, (ROM), a random access memory (RAM), a magnetic disk, or an optical disc.

Persons skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

In the foregoing specific implementations, the objectives, technical solutions, and beneficial effects of the present invention are further described in detail. It should be understood that the foregoing descriptions are merely specific implementations of the present invention.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A packet flow out-of-order detection method, wherein the method comprises:
   receiving, by a first node, a first packet from a second node, wherein the first packet comprises a flow segment sequence number of the first packet;
   after receiving the first packet, receiving, by the first node, a second packet from the second node, wherein the second packet comprises a flow segment sequence number of the second packet, and the first packet and the second packet belong to a same packet flow;
   comparing, by the first node, the flow segment sequence number of the first packet with the flow segment sequence number of the second packet, to obtain a first comparison result;
   determining, by the first node based on the first comparison result, whether the packet flow is out of order;
   counting, by the first node, a quantity of times that the packet flow is determined to be out of order;
   calculating, by the first node, a target time interval of flow segments of the packet flow based on the quantity of times that the packet flow is out of order; and
   sending, by the first node, the target time interval to the second node for configuring the second node to divide the packet flow into flow segments based on the target time interval.

2. The method according to claim 1, wherein the determining, by the first node based on the first comparison result, whether the packet flow is out of order comprises:
   when the flow segment sequence number of the second packet is less than the flow segment sequence number of the first packet, determining, by the first node, that the packet flow is out of order.

3. The method according to claim 1, wherein the second packet further comprises a first identifier, and a value of the first identifier indicates whether the second packet belongs to a first flow segment of a subflow of the packet flow; and
   the determining, by the first node based on the first comparison result, whether the packet flow is out of order comprises:
   determining, by the first node based on the first comparison result and the value of the first identifier, whether the packet flow is out of order.

4. The method according to claim 3, wherein the determining, by the first node based on the first comparison result and the value of the first identifier, whether the packet flow is out of order comprises:
   when the flow segment sequence number of the second packet is less than the flow segment sequence number of the first packet, and the value of the first identifier indicates that the second packet does not belong to the first flow segment of the subflow of the packet flow, determining, by the first node, that the packet flow is out of order.

5. The method according to claim 1, wherein the method further comprises:
   counting, by the first node, a quantity of times that the packet flow is out of order, and sending the quantity of times that the packet flow is out of order to the second node or a controller.

6. The method according to claim 5, wherein the method further comprises:
   counting, by the first node, a quantity of flow segments of the packet flow that are received within a unit of time, and sending the quantity of flow segments of the packet flow to the second node or the controller.

7. The method according to claim 1, wherein the calculating, by the first node, the target time interval of flow segments of the packet flow based on the quantity of times that the packet flow is out of order comprises:
counting, by the first node, a quantity of times that the packet flow is not out of order;
obtaining, by the first node, a preset time interval of the flow segments into which the second node divides the packet flow;
calculating, by the first node, an out-of-order rate of the packet flow based on the quantity of times that the packet flow is out of order and the quantity of times that the packet flow is not out of order;
comparing, by the first node, the out-of-order rate of the packet flow with a preset out-of-order rate, to obtain a second comparison result; and
calculating, by the first node, the target time interval of the flow segments of the packet flow based on the second comparison result and the preset time interval.

8. The method according to claim 1, wherein the calculating, by the first node, the target time interval of flow segments of the packet flow based on the quantity of times that the packet flow is out of order comprises:
counting, by the first node, a quantity of flow segments of the packet flow that are received within a unit of time;
comparing, by the first node, the quantity of flow segments of the packet flow with a preset quantity, to obtain a third comparison result; and
calculating, by the first node, the target time interval of the flow segments of the packet flow based on the quantity of times that the packet flow is out of order and the third comparison result.

9. A packet processing method, wherein the method comprises:
obtaining, by a second node, a first packet, wherein the first packet carries a flow segment sequence number of the first packet that indicates a sequence number of a flow segment to which the first packet belongs;
sending, by the second node, the first packet to a first node;
after obtaining the first packet, obtaining, by the second node, a second packet, wherein the second packet carries a flow segment sequence number of the second packet that indicates a sequence number of a flow segment to which the second packet belongs, wherein when the second packet and the first packet belong to a same packet flow, the flow segment sequence number of the second packet is determined based on a comparison of a first preset time interval to a time interval between the second packet and the first packet, the first preset time interval generated by the first node based on a quantity of times that the packet flow is determined by the first node to be out of order; and
sending, by the second node, the second packet to the first node.

10. The method according to claim 9, wherein when the time interval between the second packet and the first packet is less than or equal to the first preset time interval, the flow segment sequence number of the second packet is the flow segment sequence number of the first packet.

11. The method according to claim 9, wherein when the time interval between the second packet and the first packet is greater than the first preset time interval and less than a second preset time interval, the flow segment sequence number of the second packet is determined based on the flow segment sequence number of the first packet, and the flow segment sequence number of the second packet is not equal to the flow segment sequence number of the first packet.

12. A packet flow out-of-order detection apparatus having a non-transitory memory storing instructions, which when executed by a processor of the packet flow out-of-order detection apparatus, causes the packet flow out-of-order detection apparatus to perform operations, comprising:
receiving a first packet from a second node, wherein the first packet comprises a flow segment sequence number of the first packet;
after receiving the first packet, receiving a second packet from the second node, wherein the second packet comprises a flow segment sequence number of the second packet, and the first packet and the second packet belong to a same packet flow;
comparing the flow segment sequence number of the first packet with the flow segment sequence number of the second packet, to obtain a first comparison result;
determining, based on the first comparison result, whether the packet flow is out of order;
counting a quantity of times that the packet flow is determined to be out of order;
calculating a target time interval of flow segments of the packet flow based on the quantity of times that the packet flow is out of order; and
sending the target time interval to the second node for configuring the second node to divide the packet flow into flow segments based on the target time interval.

13. The apparatus according to claim 12, wherein the operations for determining, based on the first comparison result, whether the packet flow is out of order causes the packet flow out-of-order detection apparatus to perform further operations, comprising:
when the flow segment sequence number of the second packet is less than the flow segment sequence number of the first packet, determining that the packet flow is out of order.

14. The apparatus according to claim 12, wherein the second packet further comprises a first identifier, and a value of the first identifier indicates whether the second packet belongs to a first flow segment of a subflow of the packet flow; and
the operations for determining, based on the first comparison result, whether the packet flow is out of order causes the packet flow out-of-order detection apparatus to perform further operations, comprising:
determining, based on the first comparison result and the value of the first identifier, whether the packet flow is out of order.

15. The apparatus according to claim 14, wherein the operations for determining, based on the first comparison result and the value of the first identifier, whether the packet flow is out of order causes the packet flow out-of-order detection apparatus to perform further operations, comprising:
when the flow segment sequence number of the second packet is less than the flow segment sequence number of the first packet, and the value of the first identifier indicates that the second packet does not belong to the first flow segment of the subflow of the packet flow, determining that the packet flow is out of order.

16. A packet processing apparatus having a non-transitory memory storing instructions, which when executed by a processor of the packet processing apparatus, causes the packet processing apparatus to perform operations, comprising:

obtaining a first packet, wherein the first packet carries a flow segment sequence number of the first packet that indicates a sequence number of a flow segment to which the first packet belongs;

sending the first packet to a first node;

after the first packet is obtained, obtaining a second packet, wherein the second packet carries a flow segment sequence number of the second packet that indicates a sequence number of a flow segment to which the second packet belongs, wherein when the second packet and the first packet belong to a same packet flow, the flow segment sequence number of the second packet is determined based on a comparison of a first preset time interval to a time interval between the second packet and the first packet, the first preset time interval generated by the first node based on a quantity of times that the packet flow is determined by the first node to be out of order; and a second sending unit, configured to send the second packet to the first node.

17. The apparatus according to claim 16, wherein when the time interval between the second packet and the first packet is less than or equal to the first preset time interval, the flow segment sequence number of the second packet is the flow segment sequence number of the first packet.

18. The apparatus according to claim 16, wherein when the time interval between the second packet and the first packet is greater than the first preset time interval and less than a second preset time interval, the flow segment sequence number of the second packet is determined based on the flow segment sequence number of the second packet, and the flow segment sequence number of the second packet is not equal to the flow segment sequence number of the first packet.

19. The apparatus according to claim 18, wherein the second packet further carries a first identifier, and a value of the first identifier is used to indicate that the second packet and an adjacent previous packet belong to a same subflow but different flow segments.

* * * * *